US006499083B1

(12) United States Patent
Hamlin

(10) Patent No.: US 6,499,083 B1
(45) Date of Patent: Dec. 24, 2002

(54) DISK-BASED STORAGE SYSTEM RESPONSIVE TO A DIRECTION-SELECTION SIGNAL FOR AUTONOMOUSLY CONTROLLING SEEKS IN A SEQUENCE DETERMINED BY THE DIRECTION-SELECTION SIGNAL AND A LOCALLY-STORED DOUBLY LINKED LIST

(75) Inventor: Christopher L. Hamlin, Cupertino, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/397,152

(22) Filed: Sep. 15, 1999

(51) Int. Cl.$^7$ ............................................... G06F 12/02
(52) U.S. Cl. ........................ 711/112; 711/154; 711/217
(58) Field of Search ................................. 711/103, 154, 711/169, 159, 217, 218, 111, 112, 113, 114; 380/4, 49; 707/101; 710/1, 52

(56) References Cited

U.S. PATENT DOCUMENTS

| | | | | |
|---|---|---|---|---|
| 4,851,998 A | | 7/1989 | Hospodor | 702/186 |
| 5,303,302 A | * | 4/1994 | Burrows | 380/49 |
| 5,519,435 A | | 5/1996 | Anderson | 725/92 |
| 5,603,063 A | * | 2/1997 | Au | 710/52 |
| 5,701,383 A | | 12/1997 | Russo et al. | 386/46 |
| 5,737,747 A | | 4/1998 | Vishlitzky et al. | 711/118 |
| 5,787,473 A | * | 7/1998 | Vishlitzky et al. | 711/134 |
| 5,796,825 A | * | 8/1998 | McDonnal et al. | 380/4 |
| 5,802,069 A | | 9/1998 | Coulson | 714/718 |
| 5,809,337 A | | 9/1998 | Hannah et al. | 710/33 |
| 5,884,093 A | * | 3/1999 | Berenguel et al. | 710/1 |
| 5,892,915 A | | 4/1999 | Duso et al. | 709/219 |
| 6,185,569 B1 | * | 2/2001 | East et al. | 707/101 |

FOREIGN PATENT DOCUMENTS

EP 0 757 31 A2 7/1996

OTHER PUBLICATIONS

Li et al., "Redundant linked list based cache coherence protocol", © 1994 IEEE, pp. 43–50.*

* cited by examiner

Primary Examiner—Do Hyun Yoo
Assistant Examiner—B. R. Peugh
(74) Attorney, Agent, or Firm—Milad G. Shara, Esq.; Knobble, Martens, Olson & Bear, LLP.

(57) ABSTRACT

A disk-based storage system for storing a plurality of data segments responds to a direction-selection signal by autonomously providing the data segments in a selected sequence so as to be concatenated together to define a continuous data stream. The disk-based storage system comprises nonvolatile storage including rotating disk media having a plurality of addressable locations. Each of the data segments is stored in a respective one of the addressable locations. Each of the addressable locations has a leading end and a trailing end. A first one of the addressable locations has a trailing end on a first track, and a second one of the addressable locations has a leading end on a second track, the second track being spaced from the first track. The non-volatile storage provides for locally storing a doubly-linked list of pointers. The system also comprises accessing structure controllable to seek to, and access, any of the addressable locations starting at the leading end and continuing through the trailing end. The system also comprises controller structure for causing the accessing structure to read the data segments in accordance with a sequence determined by the doubly-linked list of pointers and the direction-selection signal. The controller structure includes autonomously-operating control structure responsive to the trailing end of the first one of the locations having been read for causing the accessing structure to seek to the second track.

6 Claims, 19 Drawing Sheets

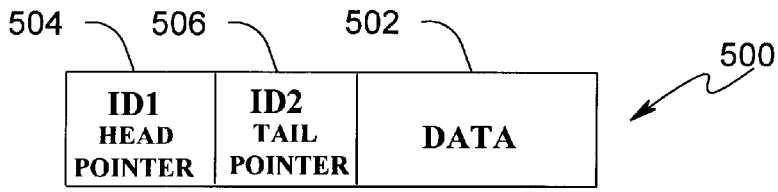
FIG.5A
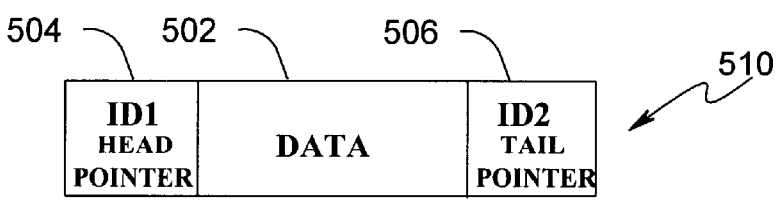
FIG.5B
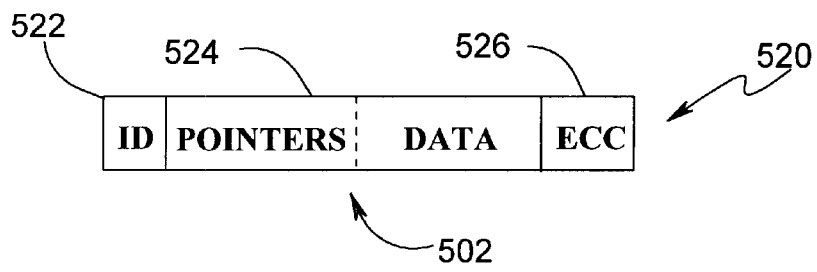
FIG.5C
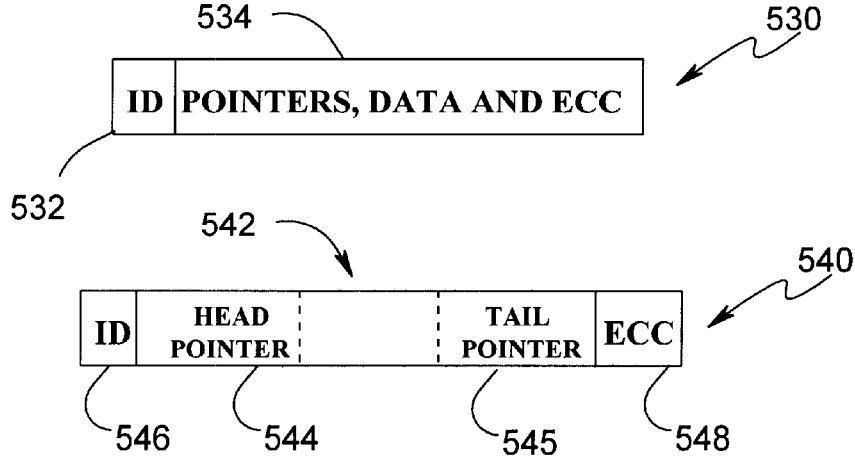
FIG.5D
FIG.5E
FIG.5F

DISK-BASED STORAGE SYSTEM RESPONSIVE TO A DIRECTION-SELECTION SIGNAL FOR AUTONOMOUSLY CONTROLLING SEEKS IN A SEQUENCE DETERMINED BY THE DIRECTION-SELECTION SIGNAL AND A LOCALLY-STORED DOUBLY LINKED LIST

BACKGROUND OF THE INVENTION

1. Field of the Invention

In general, this invention relates to a disk-based storage system; more particularly, it relates to such a system that receives a direction-selection signal and autonomously controls seeks in a sequence determined by the direction-selection signal and a locally-stored doubly linked list.

2. Description of the Related Art

A number of related markets exist for disk-based storage systems for supporting the playback of data streams such as audio/visual ("A/V") streams. Among these are markets for image repositories, video on demand, networked video, and consumer TV time shifting.

Disk-based storage systems designed for these markets are described in various patents. Among these are: U.S. Pat. No. 5,701,383, titled "VIDEO TIME-SHIFTING APPARATUS"; U.S. Pat. No. 5,519,435, titled "MULTI-USER, ON-DEMAND VIDEO STORAGE AND RETRIEVAL SYSTEM INCLUDING VIDEO SIGNATURE COMPUTATION FOR PREVENTING EXCESSIVE INSTANTANEOUS SERVER DATA RATE"; U.S. Pat. No. 5,737,747, titled "PREFETCHING TO SERVICE MULTIPLE VIDEO STREAMS FROM AN INTEGRATED CACHED DISK ARRAY"; and U.S. Pat. No. 5,892,915, titled "SYSTEM HAVING CLIENT SENDING EDIT COMMANDS TO SERVER DURING TRANSMISSION OF CONTINUOUS MEDIA FROM ONE CLIP IN PLAY LIST FOR EDITING THE PLAY LIST."

A performance requirement for substantially all such disk-based storage systems is to respond to user control. As used herein, the term "user control" refers to inputs provided by the user or operator (such as "play," "fast forward," "pause," "rewind," etc.). The "play" item indicates a forward direction and the "rewind" item indicates a reverse direction. A market requirement for substantially all such disk-based storage systems is to be cost effective, whereby a mass market consumer system needs to be extremely low in cost, but even a high-performance broadcast-market system needs to be cost competitive.

A problem commonly arising in the disk-based systems designed for these markets relates to reducing command-protocol latency and doing so in a cost-effective way.

With respect to cost effectiveness, a system design benefits from incorporating component subsystems that are, or are easily-modified versions of, mass-produced products. This is the case even in high-performance broadcast-market systems, as indicated in some of the above-identified patents that emphasize the advantage of building the system with component subsystems that constitute or are derived from commodity products such as commodity personal computers and commodity disk drives.

With respect to command-protocol latency, a system design benefits from reducing such latency, thereby to provide more bandwidth for handling the core functions needed for streaming. Command-protocol latency generally includes a number of elements that can be described with reference to communication between disk-drive structure and host structure. The term host structure is used in a very broad sense and includes without limitation standalone structure such as the commodity computers described as stream servers in some of the above-identified patents, and other structure such as programmable microprocessor-based circuitry integrated into the front end of a disk-based storage system such as that disclosed in U.S. Pat. No. 5,802,069, titled "IMPLEMENTING MASS STORAGE DEVICE FUNCTIONS USING HOST PROCESSOR MEMORY," or in U.S. Pat. No. 5,809,337, titled "MASS STORAGE DEVICES UTILIZING HIGH SPEED SERIAL COMMUNICATIONS," or in published European Patent Application No. EP 0 757 310 A2, titled "CONTROLLING DISK DRIVES," (this published application describing a disk drive in column 11, lines 22 et seq., which includes a disk scheduler as part of an integrated disk drive. For brevity hereinafter, such host structure is referred to as a "host." Similarly, the term "disk-drive structure" is used in a very broad sense to encompass hard disk drives having industry-standard interfaces such as IDE, SCSI, 1394, etc., and also to encompass head disk assemblies ("HDA's") and associated electronics such portions of integrated drive/host systems; such disk-drive structure is hereinafter sometimes briefly referred to as a "drive."

Command-protocol latency includes a number of elements. One of these elements is a software-associated latency relating to execution of instructions to organize and issue a host command. Two other elements are latencies that relate to the transmission and reception of the command while it propagates from the host and while it is received by the drive. An additional element relates to the latency involved in parsing of the command by the drive. For additional background regarding command-protocol latency, see U.S. Pat. No. 4,851,998, titled "METHOD FOR ANALYZING PERFORMANCE OF COMPUTER PERIPHERALS"; note particularly FIG. 2 and column 4, lines 22–54.

As for certain high-performance broadcast-market systems, the prior art (such as U.S. Pat. No. 5,892,915 cited above and hereinafter referred to as the '915 patent) teaches a hierarchical arrangement involving multiple levels of command-protocol latency. As shown in FIG. 28 of the '915 patent, the described system includes, at a first level of the hierarchy, a controller server; at a second level of the hierarchy, a stream server; and at a third level of the hierarchy, a cached disk array. Each of the controller servers and each of the stream servers is described as being a high-end commodity computer including an Intel processor such as a Pentium and including substantial amount of random access memory (RAM) such as 64 megabytes.

The hierarchical arrangement of the '915 patent involves a distribution among the levels of certain important control functions associated with storing control data, and involves communications between the various levels in which communications there are numerous dialogs and control-data transfers. In accord with this distribution important lists of control data are stored remotely from the drives in the cached disk array. These remotely stored lists are the subject of the following dialogs and control-data transfers between the various levels: One such dialog and transfer is the sending and delivery of a remotely-stored stripe set list from the controller server to a selected one of the steam servers. The controller server maintains a clip directory and numerous such remotely-stored stripe set lists. Each remotely-stored stripe set list is associated with a respective clip identified in the clip directory. Each remotely-stored stripe set list includes a doubly-linked list of entries, and each entry includes a starting stripe set number, an ending stripe set number, and a value indicating the number of data segments included in the terminal stripe set. Therefore, each entry in the list represents in sequence data segments beginning in the initial stripe set, continuing in any intermediate stripe set, and ending in the terminal stripe set. Multiple other such dialogs and transfers occur as the stream server controls the cached disk array. Each stream server remotely maintains a pointer to the current play position in the clip it is currently controlling for a client. The stream server repeatedly issues prefetch commands to the cached disk array so that the succession of stripe sets 325 are prefetched one by one from the drives in the cached disk array. The command-protocol latencies involved are significant factors adversely affecting the overall performance of the system.

SUMMARY OF THE INVENTION

This invention can be regarded as a disk-based storage system for storing a plurality of data segments and for responding to a direction-selection signal by autonomously providing the data segments in a selected sequence so as to be concatenated together to define a continuous data stream. The direction-selection signal is preferably defined in response to user control for selecting direction including "forward" corresponding to "play" for an A/V stream; the form of the direction-control signal is subject to a broad range including but not limited to multi-bit commands (whether serial or parallel), or a binary-valued logic signal, or other form of signal. The disk-based storage system comprises nonvolatile storage means including rotating disk media having a plurality of addressable locations. Each of the data segments is stored in a respective one of the addressable locations. Each of the addressable locations has a leading end and a trailing end. As used herein, the terms "leading" and "trailing" refer to those portions of an addressable location or of a data structure or field which are first and last to encounter a given read/write head, respectively, based on a given rotation of rotating media.

A first one of the addressable locations has a trailing end on a first track, and a second one of the addressable locations has a leading end on a second track, the second track being spaced from the first track.

Significantly, the non-volatile storage means includes means locally storing a doubly-linked list of pointers. Preferably, the doubly-linked list of pointers is stored in the disk media.

The disk-based storage system also comprises accessing means controllable to seek to, and access, any of the addressable locations starting at the leading end and continuing through the trailing end.

Significantly, the disk-based storage system also comprises controller means for causing the accessing means to read the data segments in accordance with a sequence determined by the doubly-linked list of pointers and the direction-selection signal. The controller means includes autonomously-operating control means responsive to the trailing end of the first one of the locations having been read for causing the accessing means to seek to the second track.

Embodiments of the invention have significant advantages including an advantage with respect to providing enabling technology for reducing command-protocol latency and doing so in a cost-effective way.

In one embodiment, a disk-based storage system according to the invention receives an record control signal, and thereafter receives a continuous stream of digital data. The disk-based storage system autonomously divides the continuous stream into segments. Significantly, the disk-based storage system autonomously generates the doubly-linked list of pointers for subsequent use in reproducing the continuous stream.

The pointers have address fields and optionally other useful information (such as status flags) which allow the disk-based storage system to operate autonomously using locally stored information to reconstruct a desired sequence of segments without adverse overhead occasioned by command-protocol latency.

Preferably, the pointers are generated based on a deterministic algorithm which accounts for the seek, rotational, and head switching latencies associated with the disk drive, and maintains such latencies within predefined limits.

In an alternative embodiment of the invention, the non-volatile storage means includes random access memory such as flash memory, and the pointers are stored within the random access memory.

Suitably, the rotating disk media comprises a plurality of magnetic hard disks included in a hard disk drive which also includes a microcontroller, a disk controller, a buffer memory, an I/O processor and an I/O interface. When receiving data via the I/O interface, the disk controller and microcontroller cooperate to dynamically generate the pointers for each incoming data segment and write them to the media with associated data segments. Address locations for the data segments in each data stream is chosen so as to maintain the latency associated with the storage and retrieval of the streaming data within predefined limits. When reading data from the disk media, the disk controller and microcontroller read the pointers associated with each data segment, and in response read the outgoing data stream in sequence.

Another preferred feature involves an improved digital data structure useful in streaming operations. In one embodiment, the data structure involves an identification (ID) field, a data segment, and one or more head-directed and/or tail-directed pointers associated or appended to the data segment. Preferably, each of the pointers has a physical address (head, sector, cylinder or logical block address (LBA) and one or more "tag" bits. The tag bits convey information about the associated individual data segment or digital data stream. In this manner, the data structure is self-defining. In one embodiment of the data structure, the pointers are embedded within the data segment. In another embodiment, the pointers are appended to or within the servo wedge.

Another preferred feature involves a method of storing and/or retrieving multiple digital data streams. According to this feature, the disk media are pre-formatted for a pre-selected number of different data streams, such that the latency between streams is kept below a desired value.

Another preferred feature involves an improved method of editing. According to this feature, the method comprises identifying the address of predecessor and successor blocks to the data segment being edited, and modifying the pointers associated with the predecessor and successor blocks so as to reflect the addition or deletion of the edited data segments. The method comprises identifying the predecessor and successor data segments for the first and last data segments in the data stream being edited, and modifying the pointers associated with those blocks to reflect the addresses of the first and last data segments in the data stream.

Another preferred feature involves a pointer error correction method. According to this feature, the error correction method comprises signaling the buffer manager when an uncorrectable pointer error occurs; retrying to correct the error; applying the pointer generation algorithm to generate the next logical seek address and an associated head-directed pointer for that address; and testing the head-directed pointer in the generated data segment.

BRIEF DESCRIPTION OF THE DRAWINGS

FIG. 5A is a graphical representation of a first format for a doubly-linked list data structure suitable for use in a disk-based storage system according to the invention, with first and second combined ID/pointer fields appended sequentially to the leading portion of each data segment.

FIG. 5B is a graphical representation of a second format for a doubly-linked list data structure suitable for use in a disk-based storage system according to the invention, with first and second combined ID/pointer fields appended to the leading and trailing portions, respectively, of each data segment.

FIG. 5C is a graphical representation of a third format for a doubly-linked list data structure suitable for use in a disk-based storage system according to the invention, with a combined pointer and data segment, and separate ID and ECC blocks.

FIG. 5D is a graphical representation of a fourth format for a doubly-linked list data structure suitable for use in a disk-based storage system according to the invention, with a combined pointer, data, and ECC block, and a separate ID block.

FIG. 5E is a graphical representation of a fifth format for a doubly-linked list data structure suitable for use in a disk-based storage system according to the invention, with separate head-directed and tail-directed pointer blocks within the data segment, and separate ID and ECC blocks appended to the data segment.

FIG. 5F is a graphical representation of a sixth format for a doubly-linked list data structure suitable for use in a disk-based storage system according to the invention, with a combined data and data ECC block, a combined pointer and pointer ECC block, and a separate ID block.

DETAILED DESCRIPTION OF THE INVENTION

Reference is now made to the drawings wherein like numerals refer to like parts throughout.

Overview

Figure 1:
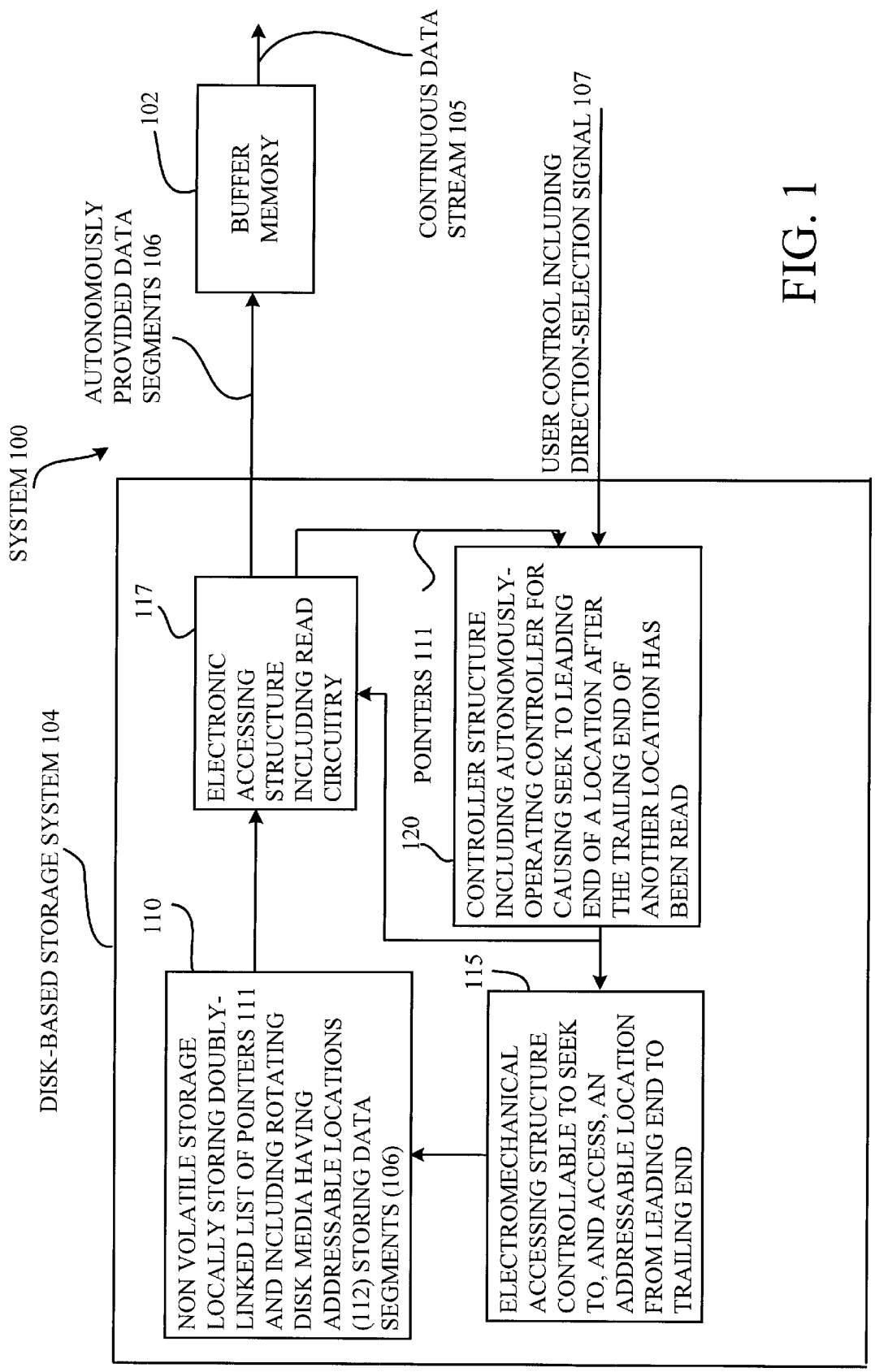
FIG. 1 is an overall logical block diagram of a system for reproducing a continuous data stream, the system including a buffer memory and a disk-based storage system that autonomously provides data segments to the buffer memory in a selected sequence so as to be concatenated together to define the continuous data stream.

With reference to FIG. 1, an overall system 100 supports the playback of data streams such as audio/visual ("A/V") streams to meet the market requirements for markets for image repositories, video on demand, networked video, and consumer TV time shifting. System 100 includes a buffer memory 102 and a disk-based storage system 104. Buffer memory 102 produces a continuous data stream 105 defined by concatenating a plurality of data segments 106 that disk-based storage system 104, in response to user control, autonomously provides to buffer memory 102. The user control includes direction-selection controls that are generally referred to herein as a direction-selection signal 107. As used herein, the terms "autonomous" and its derivatives such as "autonomously-operating" refer to features involved in the construction and operation of disk-based storage system 104 by which, without repetitiously incurring the penalty of command-protocol latency, it locally controls both electromechanical accessing structure (such as a head stack assembly and associated head positioning servo system) and electronic accessing structure (including read circuitry) to perform a sequence of operations in an order determined by a locally stored doubly-linked list and the direction-selection signal. Because of this autonomously-operating feature, disk-based storage system 104 reduces the command-protocol latency involved in prior art systems described above, and it does so in a cost-effective way.

Disk-based storage system 104 comprises nonvolatile storage 110 including rotating disk media having a plurality of addressable locations 112. Each of the data segments 106 is stored in a respective one of the addressable locations 112.

Figure 4:
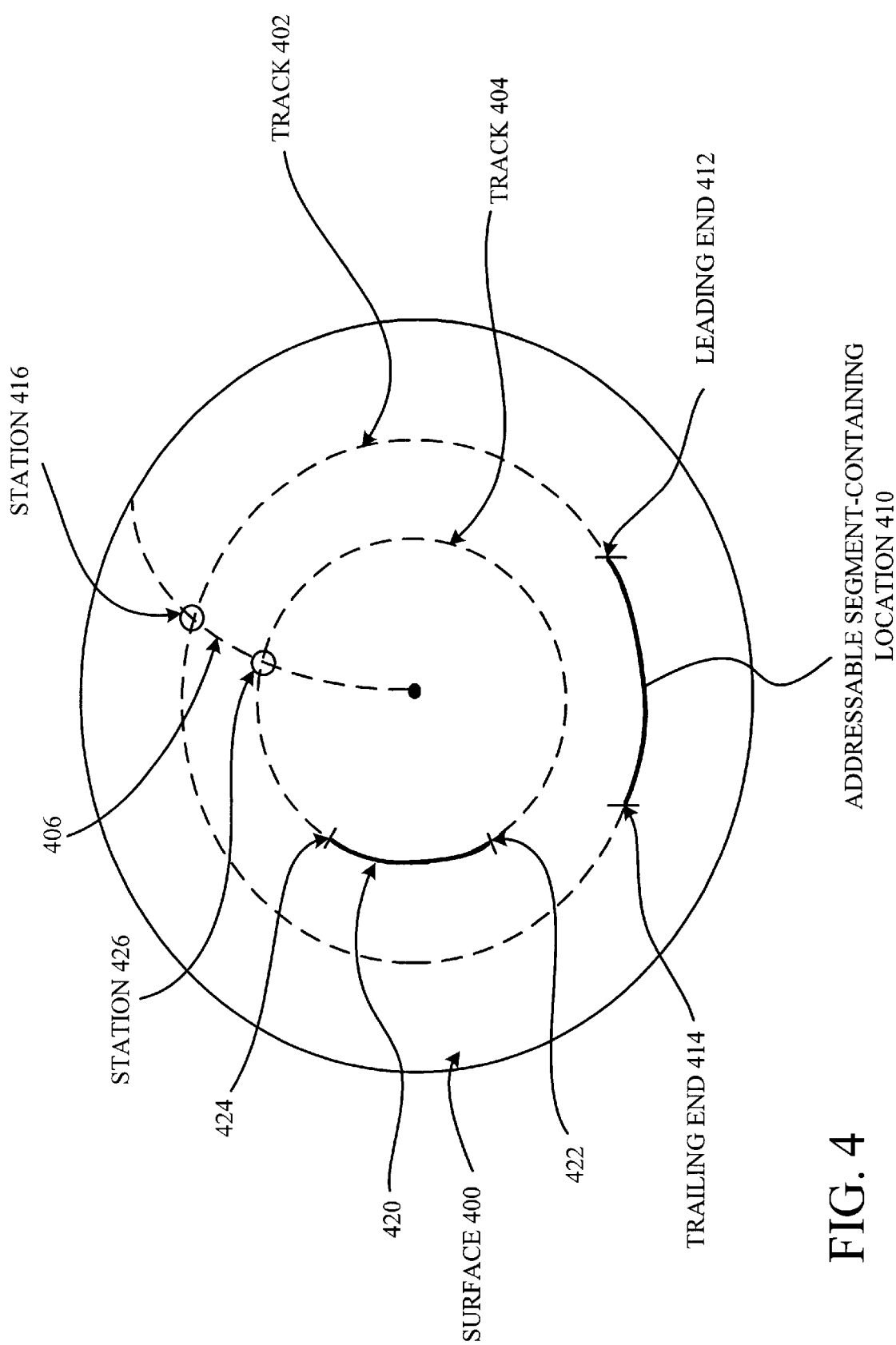
FIG. 4 is a schematic representation of disk-media recording surface, and shows a first track including an addressable location, and a second track including another addressable location, and illustrates the leading end and trailing end of each addressable location.

With reference to FIG. 4, a disk-media recording surface 400 has a multiplicity of tracks including a first track 402 and a second track 404. An arc 406 shown by a dashed line represents a locus of points above which an associated head of a head stack assembly travels as an actuator rotates relative to a pivot axis.

Track 402 includes an addressable location 410 that revolves around the center of disk rotation in an counter-clockwise direction as viewed in FIG. 4. Addressable location 410 includes a leading end 412 and a trailing end 414. While the associated head is positioned at the point on arc 406 indicated as station 416, a data segment stored in addressable location 410 can be read starting when its leading end 412 reaches conjunction with station 416 and continuing until its trailing end 414 passes station 416. Similarly, track 404 includes an addressable location 420 having a leading end 422 and a trailing end 424. While the associated head is positioned at the point on arc 406 indicated as station 426, a data segment stored in addressable location 420 can be read starting when its leading end 422 reaches conjunction with station 426. In the case illustrated in FIG. 4, each addressable location is entirely contained within a single track, whereby the associated head remains at the same station throughout the reading of a complete data segment. In the case of an embedded servo disk drive, the data segment can be interrupted by servo wedges (not shown). Also, a data segment can be defined in chunks with one chunk on one recording surface and another chunk on another recording surface, in which case a head switch operation would be autonomously be provided. Also, in accord with an invention conceived by a co-worker of the inventor hereof and owned by the assignee hereof, each addressable location can be divided into portions allocated to regularly spaced-apart tracks, in which case regular-length seeks would be autonomously provided to read out the sequence of chunks constituting the data segment.

In general, disk media has a multiplicity of addressable locations; each addressable location has a leading end and a trailing end; and each addressable location is capable of storing a respective one of the data segments. Each data segment can be read while the associated head is appropriately positioned, starting when its leading end reaches conjunction with the respective station.

With reference again to FIG. 1, non-volatile storage 110 includes means locally storing a doubly-linked list of pointers 111. Preferably, the doubly-linked list of pointers is stored in the disk media. Each of these pointers has a multi-dimensional spatial aspect in that each, directly or indirectly provides coordinates for cylinder, head, and sector identification of the leading end of a corresponding addressable location. Another aspect of these pointers involves a temporal aspect; that is, directly or indirectly, each pointer indicates an amount of time that will elapse from the end of a current addressable location until the head and disk are in the relative position at which the leading end of the pointed-to addressable location is accessible.

The disk-based storage system also comprises accessing structure controllable to seek to, and access, any of the addressable locations starting at the leading end and continuing through the trailing end. Suitably, this controllable accessing structure includes electromechanical accessing structure 115 and electronic accessing structure 117.

Significantly, disk-based storage system 104 also comprises controller structure 120 for causing accessing structure 115 and 117 to read data segments 106 in accordance with a sequence determined by the doubly-linked list of pointers 111 and direction-selection signal 107. Any practical system requires the capability to produce a continuous data stream having a multiplicity of concatenated data segments read from a multiplicity of tracks, whereby a large number of seeks need to be performed during time intervals between the time periods during which reading of data segments takes place. Controller structure 120 includes an autonomously-operating controller for causing accessing structure 115 to seek. For example, when trailing end 414 of addressable location 410 in track 402 passes station 416, the autonomously-operating controller responds to that trailing end having been read by causing accessing structure 115 to seek to a station 418 such that the head is above track 404, and the autonomously-operating controller causes electronic accessing structure 117 to commence reading the data segment in addressable location 420 when leading end 422 reaches conjunction with station 430.

Doubly-Linked List Methodology

The basic principles and general advantages of linked lists are described in textbooks such as those authored by Donald E. Knuth, including Fundamental Algorithms and Sorting an Searching, both published by Addison Wesley. In a general way, doubly-linked lists are known to be useful in a video server, as indicated for example by the '915 patent cited in the Background section above.

With respect to the local storage of doubly-linked lists in a disk-based system, disclosed herein are several basic approaches or methods of implementation of appropriate data structures. These include: (i) head and tail-directed pointers stored in a random access memory within the disk drive; (ii) pointers stored in data areas on the rotating disk media; and (iii) pointers stored in the servo wedge areas or similar areas of the disk media. The term "data structure" refers to the combination of a "payload" - i.e., a data segment, and its associated pointers. However, the term data structure does not require physical proximity between data segments and associated pointers. Each of the approaches described, including associated hardware, firmware, or algorithms, are described in detail with respect to FIGS. 5A through 6C. Another approach involves pointers forming a linked list pre-recorded or pre-formatted on the disk media. Yet other approaches or methods of implementing the linked list functionality may be employed.

As used herein, the terms "head-directed pointer" and "tail-directed pointer" (or similarly, "head pointer" and "tail pointer") refer to data addresses or other representations of the location of data on or within one or more storage devices. The terms "head" and "tail" refer to the relative position of the pointer with respect to the payload data with which the pointer is associated, the "head" pointer provides the address to access the data segment immediately preceding the current payload data /pointer structure in the data sequence, whereas the "tail" pointer refers to the address to access the data segment immediately following the current data segment. When a given data segment includes both head- and tail-directed pointers, the data segment is said to be "doubly linked". Descriptive terms other than "head-directed pointer," "tail-directed pointer," or "doubly linked" may be used to represent utilizing reference addresses associated with data to define a sequence of digital data within a data stream. The pointers may be used in other capacities. For example, the pointers may be used to denote a predetermined location or address within the media which is not relative to the data segment with which the pointer is associated (such as a fixed location storage address within the media). Alternatively, the pointers may be used to reference addresses associated with a data segment which does not immediately precede or follow the data segment with which the pointers are associated, such as a referring to a data segment further "upstream" or "downstream." Many alternate configurations of the pointers are possible.

The pointers may be pre-recorded prior to writing of the payload data to the media, dynamically generated and recorded during write operations, or some combination. This is described in greater detail with respect to FIGS. 13–15 herein.

Finally, the term "address" as used herein refers to any reference which provides for identifying the storage location (physical or logical) of data on the disk media. For example, an address could comprise a physical location reference (such as a head, sector, cylinder address), a logical transformation of the physical address, or a relative offset address.

Suitable Hardware/Firmware Implementation

Figure 2:
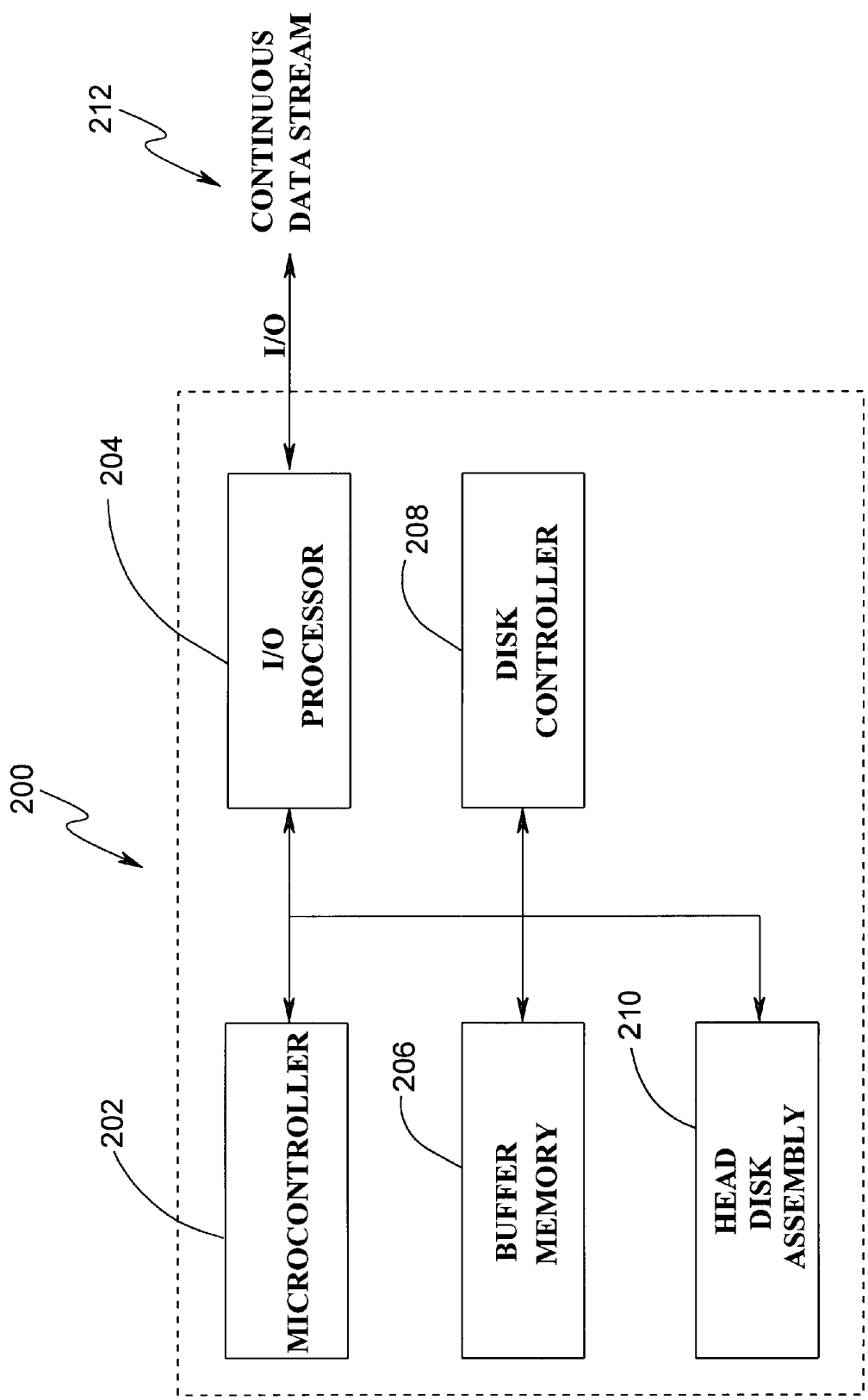
FIG. 2 is a block diagram of one embodiment of a hard disk drive organized to reproduce a continuous data stream.

With reference to FIG. 2, a disk drive 200 is organized to provide a complete system including a buffer memory and a disk-based storage system. Drive 200 is organized to receive, partition and record, read and concatenate, and isochronously reproduce a continuous data stream. Suitably, drive 200 is configured to support time-shifting and accordingly can interleave writing and reading time-separated sections of the same continuous data stream. Also, drive 200 is suitably configured to support interleaved handling of multiple continuous data streams.

Drive 200 includes a microcontroller 202, an input/output ("I/O") processor 204 defining an I/O interface, a buffer memory 206, a disk controller 208, and a HDA 210 that includes rotating disk media and a head stack assembly. The continuous data stream that disk drive 200 receives, partitions and records, reads and concatenates, and isochronously reproduces is identified as continuous data stream 212; it is received from an external host or other source via I/O processor 204.

During recording processes, continuous data stream 212 is divided or partitioned into a multiplicity of incoming data segments that are temporarily stored in buffer memory 206; each of these incoming data segments is autonomously read from buffer memory 206; microcontroller 202 and disk controller 208 dynamically generate, and autonomously control access with, pointers defining a doubly-linked list; and each data segment is written to a respective one of a multiplicity of addressable locations in tracks of HDA 210.

During reproducing processes, microcontroller 202, I/O processor 204, buffer memory 206, disk controller 208, and HDA 210 cooperate such that data, including data defining pointers and data defining data segments of continuous data stream 212, are read from addressable locations of HDA 210 in a sequence determined by the pointers and a direction-selection control signal received via the I/O interface. The read data forming the data segments are stored in buffer memory 206, and read out through the I/O interface as directed by microcontroller 202 and disk controller 208 in order to produce the continuous data stream 212, which can be transmitted to the external host or other device.

I/O processor 204 and the I/O interface are suitably compatible with a standard data interface such as IDE, SCSI, IEEE Std. 1394, etc. IEEE Std. 1394 has advantages in that it is capable of carrying large quantities of digital data (up to a gigabit per second or more) in multiple streams isochronously. Because the linked list functionality is locally implemented, the I/O interface is effectively transparent, and most any type of interface (such as an EIDE, SCSI, SSA, Fibre Channel, or NGIO) may be used. Buffer allocations made by controller 208 during streaming processes are readily adapted to the chosen data interface.

Figure 3A:
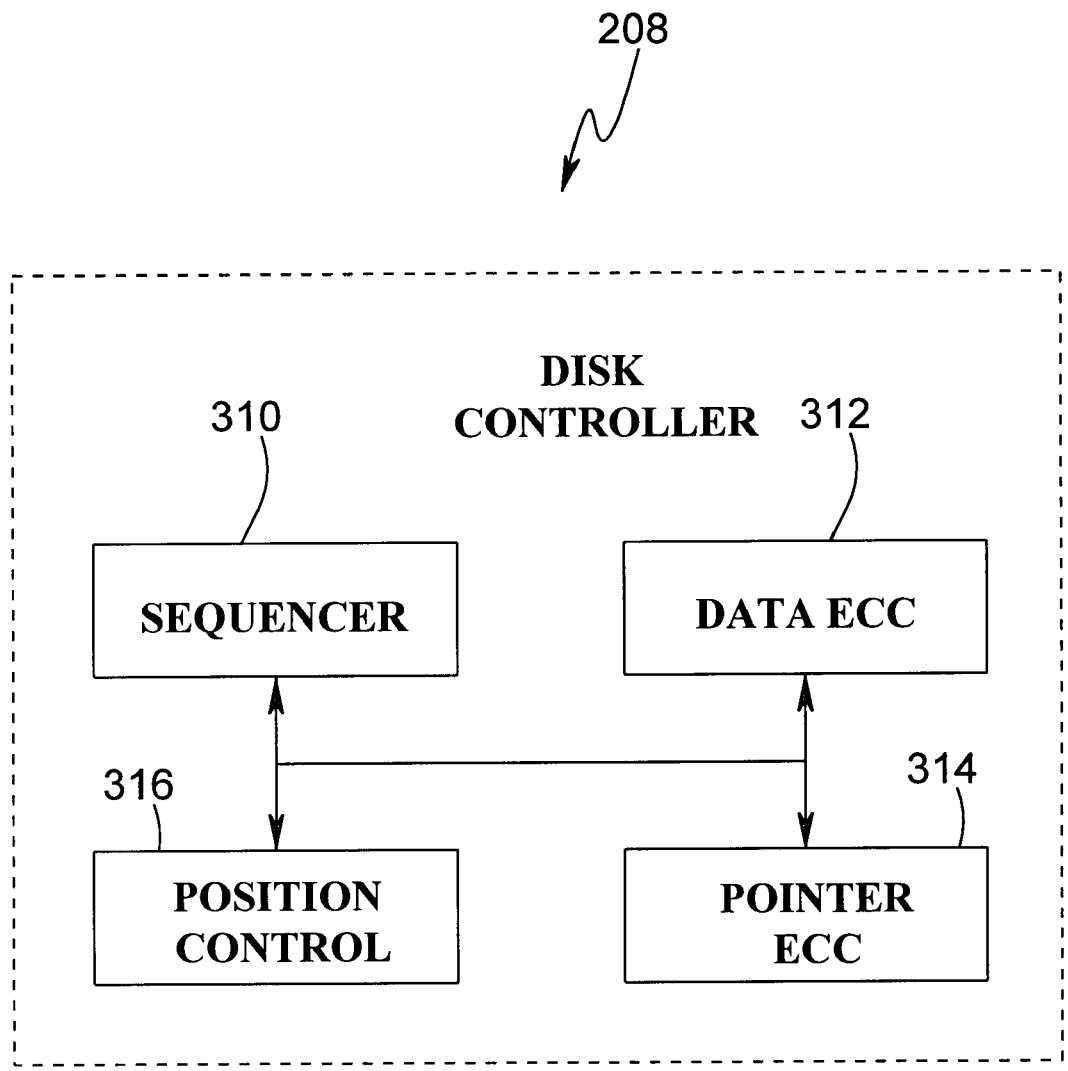
FIG. 3A is a block diagram of one embodiment of the disk controller used in the hard disk drive of FIG. 2.

With reference to FIG. 3A, a suitably arranged disk controller 208 includes structure for supporting four primary functions: (i) determining and writing the head and tail-directed pointers to the addressable locations for the data segments; (ii) updating pointers; (iii) acting upon head or tail-directed pointers so as to read or write the appropriate next data segment in a sequence; and (iv) reading or writing a data segment in conjunction with a pointer operation. Disk controller 208 comprises a sequencer 310, a data error correction code (ECC) module 312, a pointer error correction code module 314, and a position control 316. Sequencer 310 determines the progression of logical operations that controller 208 carries out during reading or writing operations. Position control 316 functions primarily to initiate a track seek. A track seek is initiated automatically by the operation of position control 316 without external commands and attendant command-protocol latencies. Position control 316 also operates under control of user control including the direction-selection control signal which suitably propagates through I/O processor 204.

Data ECC module 312 effects error correction based on error detection and correction analysis performed for the data segments stored on the media. Similarly, pointer ECC module 314 corrects errors present in the head/tail-directed pointers, as described with respect to FIG. 18. The use of a separate pointer ECC module 314 is particularly advantageous in the case of non-linear data editing, because it facilitates the alteration (and correction) of the pointers associated with certain individual data segments. The specific configuration of error correction code operations of the type utilized for the data ECC are well known in the data processing arts, and thus will not be described. Data ECC module 312 and pointer ECC module 314 can be integrated together.

Pointer ECC module 314 and data ECC module 312 may use different algorithms, if desired. Preferably, the data ECC is less stringent than the pointer ECC because the potential effects resulting from errors in the pointers is large (e.g., possible termination of the stream), whereas the effects associated with errors in the data are less significant.

Figure 3B:
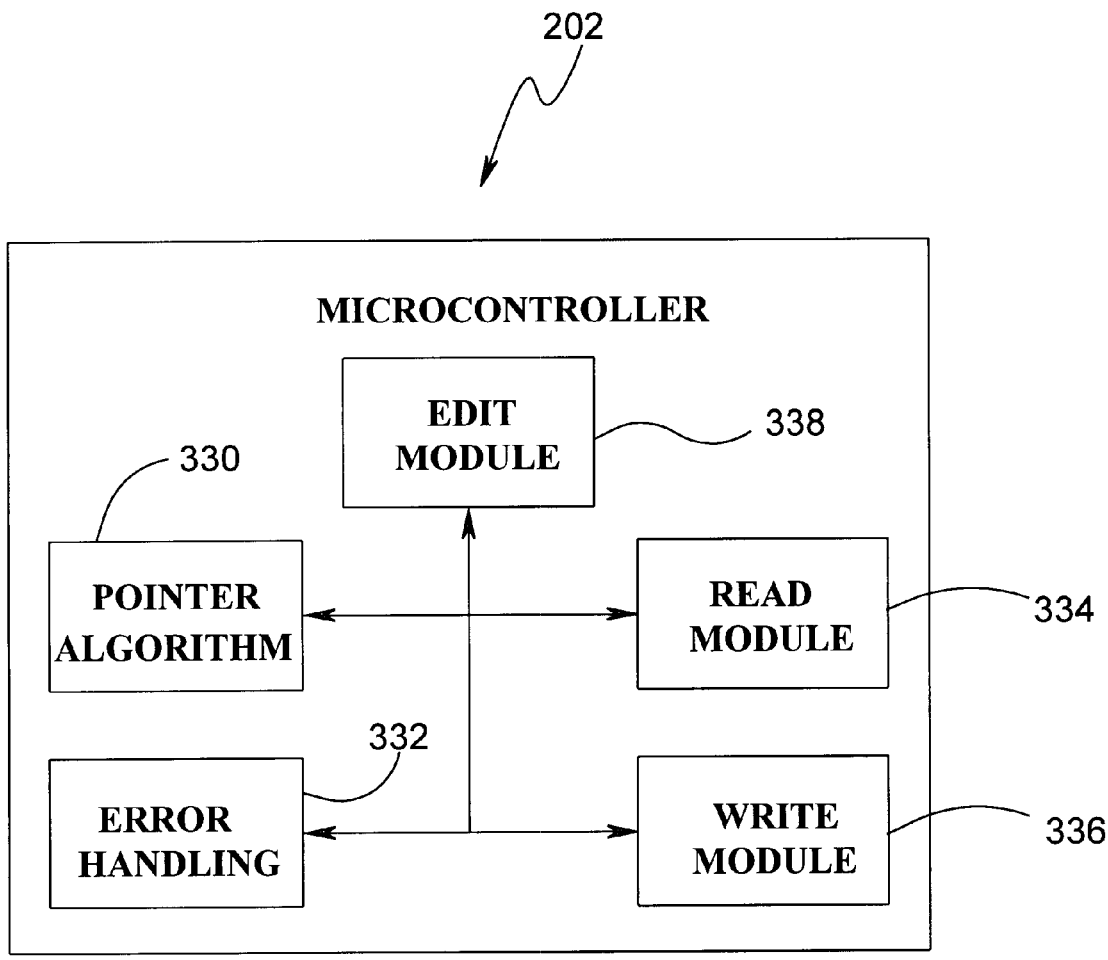
FIG. 3B is a block diagram of one embodiment of the microcontroller used in the hard disk drive of FIG. 2.

With reference to FIG. 3B, microcontroller 202 suitably includes firmware-controlled hardware to provide a pointer module 330, an error handling module 332, a read module 334, a write module 336, and an edit module 338. Pointer algorithm module 330 executes the pointer algorithms and is used to generate head and tail-directed pointers. Read and write modules 334 and 336 direct the operation of the read and write functions of the controller, as described in greater detail below with respect to FIGS. 13–17. Suitably, read module 334 controls timing for operation of read circuitry accessing the data segments as described above with respect to FIG. 1. Edit module 338 implements edit functions, as discussed with reference to FIG. 19 below.

Suitably, disk controller 208 provides support, not only for autonomous operation with respect to the host for handling streaming data such as video data, but also provides support for asynchronously commanded writes and reads. For example, with disk drive 200 being interfaced with a personal computer such as a desktop, laptop, or similar computer, a consistent physical format is maintained between the synchronous streamed digital data and asynchronous digital data stored and retrieved by the host processor for application programs. The host processor need not interfere with differences between streamed digital data (such as synchronous video data) stored at linked addresses and the asynchronous data which as seen by the host is stored in accordance with the file allocation table of the host. Accordingly, no significant additional burden on the hardware, software, or firmware associated with the host and its components is imposed. Rather, the host processor can simply provide read and write requests to disk drive 200, which receives and autonomously processes such requests. Disk drive 200 may allocate separate physical or logical sectors on the disk media for asynchronous digital data or may intermingle such data with streaming data. In addition, disk drive 200 may utilize the pointers for the asynchronous data as part of its interpretation of request from the host based on a file allocation table. Alternatively, disk drive 200 can be configured to operate in a conventional manner based upon storing data in accordance with the file allocation table.

While the foregoing figures illustrate various hardware/firmware arrangements, an appropriate system may be implemented with entirely conventional hardware and appropriate firmware, depending on the attributes of the existing hardware components and the functionality required. For example, the functionality associated with more simple single stream read/write/edit applications may readily be embodied in the firmware of programmable integrated circuits. As the complexity of the application increases, hardware modifications may be necessitated.

According to one arrangement of drive 200, the linked list of pointers is maintained within known addresses of a non-volatile memory such as a flash memory rather than being stored on the disk media. Disk controller 208 can access the linked list from the flash memory when storing incoming data or retrieving stored data. Accordingly, no algorithm is required to generate optimal data storage locations or their associated pointers, since the addresses are already computed and stored. Likewise, if the disk is pre-formatted with pointers written on the media prior to data operations, disk controller 208 suitably reads these pointers and controls disk operations in accordance with the pointers, and pointer calculations are not required for write operations. However, pointer calculations are necessary for a system that supports edit operations and error correction as further described below.

Data Structures

Figure 6A:
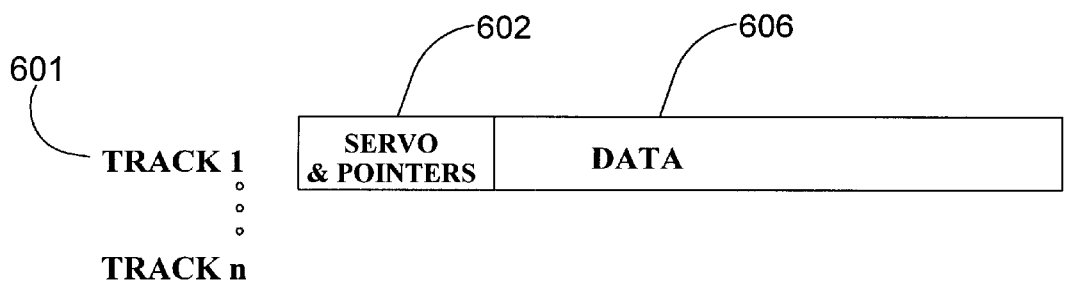
FIGS. 6A–6C are graphical representations of three different formats each of which is suitable incorporating a doubly-linked list within a servo region of a track.
Figure 6B:
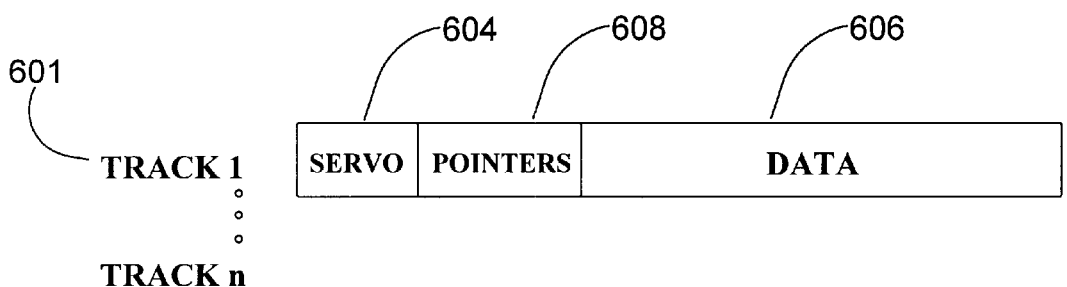
Figure 6C:
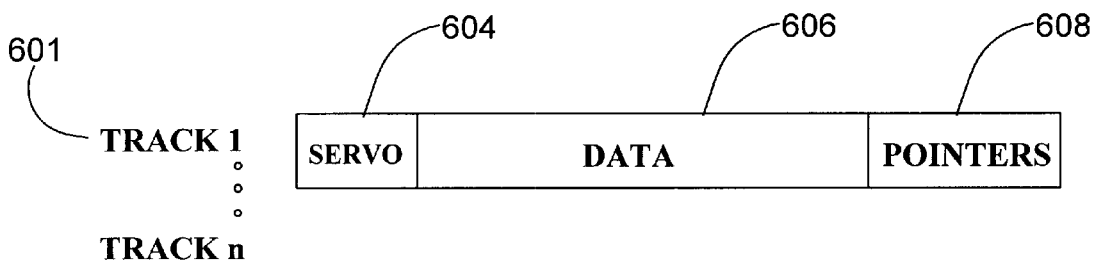

With reference to FIG. 5A through 5F, and 6A–6C, there will now be described various data structures for implementing the linked list of pointers. FIGS. 5A and 5B involve the approach of embedding the pointers within discrete data segments which are separate from the payload data segment associated with the pointers. FIGS. 5C–5E involve the approach of embedding the pointers in some fashion within the existing payload data segments. FIGS. 6A–6C involve using pointers within embedded servo sectors or other dedicated locations of the media. FIGS. 5A–5F and 6A–6C are logical in nature, and do not necessarily represent physical formats.

With reference to FIG. 5A, a data structure 500 comprises two combined ID and head and tail-directed pointer data segments 504, 506 and a payload data segment 502. These pointer data segments 504, 506 are appended in series (i.e. head, then tail) on the "leading" edge of the data segment 502. Note that the head/tail-directed pointers recorded in conjunction with the combined ID/pointer data segments 504, 506 are advantageously subjected to the ECC operations with the ID field in this embodiment.

With reference to FIG. 5B, a data structure 510 comprises a payload data segment 502, a combined ID and head-directed pointer data segment 504 at the leading edge of the payload data segment 502, and a combined ID and tail-directed pointer data segment 506 appended at the trailing edge of the payload data segment 502.

With reference to FIG. 5C, a data structure 520 comprises a separate ID data segment 522, a single combined head and tail-directed pointer data segment 524 which is contained within the payload data segment 502, and an ECC data segment 526. The pointers may be written into the data segment 502 in virtually any position or encoded into the data. The programming of controller 208 (FIGS. 2 and 3A) permits the additional bytes of data representing the pointers to be accommodated in normal data segment 502, and therefore also to be covered by the ECC calculations for the data segment 502.

With reference to FIG. 5D, a data structure 530 comprises an ID data segment 532 at the leading edge of a combined head and tail-directed pointer, data, and ECC data segment 534. In this embodiment, the controller 208 is programmed to accommodate the additional data bytes associated with the pointers and ECC.

With reference to FIG. 5E, a data structure 540 comprises a combined pointer and data segment 542, with the head-directed pointer 544 being disposed at the leading edge of the combined data segment 542, and the tail-directed pointer 545 disposed at the trailing end. Separate ID and ECC data segments 546, 548 are disposed before and after the combined data segment 542.

With reference to FIG. 5F, a data structure 550 comprises an ID data segment 552, combined payload data and ECC data segment 554, and combined pointer/ECC data segment 556. The ECC present in the combined data and ECC data segment 554 addresses errors existing within the data, while the combined pointer/ECC data segment 556 addresses errors in the pointers.

Other combinations are suitable including any in which the order of head and tail is permuted.

The above-described arrangements for locating the pointers on the disk media each have considerations which require different programming in the disk controller. These differences are easily accommodated by such programming. The embodiments with the pointers written with the data tend to be more efficient than with pointers for the disk all stored in one location because more disk head movement is required if the pointers are stored all at one location. Placing pointers in random access memory is faster, yet more costly, than writing pointers to the disk media.

The pointers may not only be alternatively (or simultaneously) embedded within the servo sectors, but also be accumulated and "clustered" in a designated or predetermined location on the disk media. For example, pointers may be clustered at the beginning or the end of a given track, with the addresses (pointers) pertaining to each of the data segments on the physical track recorded together at that location. Furthermore, such clustered pointers for successive tracks may be co-located in sector space if desired such that each separate track has its pointers clustered at the same sector address.

With reference to FIGS. 6A–6C, the references therein to "servo" refer to servo sectors of the kind incorporated in contemporary embedded-servo drives, which store unambiguous track identification data and servo bursts for track following operations.

In FIG. 6A, the head and tail-directed pointers stored in a given track 601 are combined with the servo data 602 which precedes the data segment 606. This data structure is repeated for all tracks 1 through n, with tracks 601 being concentric, with the pointer/servo wedge 602 for each track being co-located in sector space and subtending an arc as measured from the axis of rotation for the disk media.

In FIG. 6B, a servo wedge 604 resides within a discrete location and precedes the pointers, the latter forming a separate or discrete data field 608 which precedes data sector 606. Although when combined with servo data, the pointers may occur more than once in a revolution of the disk media, in the embodiment of FIG. 6B, the pointers may be provided in only one general location for each cylinder of the disk drive. Alternatively, the pointers are provided with each servo field.

In FIG. 6C, the pointers are disposed in a separate pointers field 608 at the trailing edge of the data segment 606, with the servo wedge 604 preceding the data segment 606.

Other embodiments of the aforementioned data structures are also possible. For example, the combined pointer/servo wedge 602 of FIG. 6A could also be placed at the trailing edge of data segment 606. Alternatively, the locations of servo wedge 604 and pointers 608 shown in FIG. 6B could be swapped. Similarly, the order of servo wedge 604 and pointers 608 could be swapped in the embodiment of FIG. 6C. Many such permutations of the locations of the servo wedge, pointers, and data segment are possible.

Figure 7:
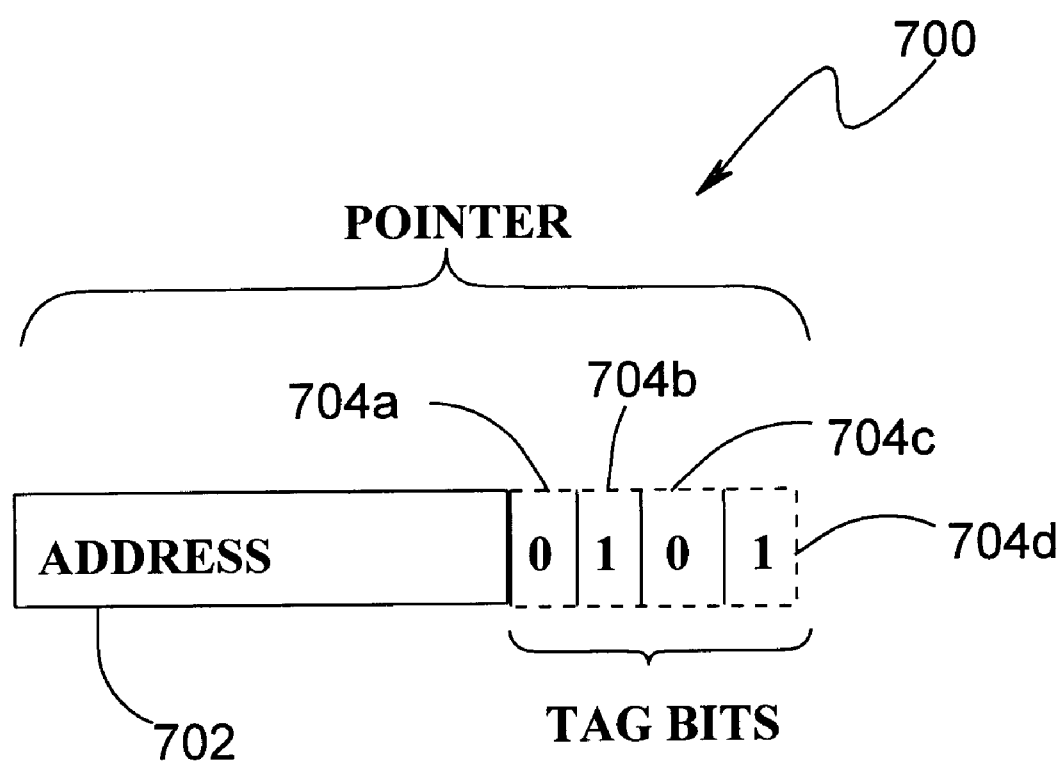
FIG. 7 is a graphical representation of one format for a data structure comprising the head- and tail-directed pointers.

With reference to FIG. 7, each pointer 700 comprises an address field 702 and one or more tag bits 704a–d. While shown following the address field in FIG. 7, the tag bits may be disposed in any relationship to the address field 702, or alternatively, may be disposed at different locations. Many permutations are possible. The address field 702 comprises a head, cylinder, sector (H,C,S) address, although other address formats may also be used. The tag bits 704a–d are individual binary data bits that function as flags to indicate various conditions relating to individual data segments. Tag bits in the present embodiment include (i) a first bit 704a indicating that the data segment associated with the pointer is used for streaming data; (ii) a second data bit 704b indicating that the pointer in which the tag is embedded is a head-directed pointer or a tail-directed pointer; (iii) a third tag bit 704c to indicate a null or EOF pointer; (iv) a fourth bit 704c used to indicate that the pointer relates to data associated with another HDA (such as in an embodiment having multiple HDA's); and (v) a tag bit indicating that the data segment associated with the pointer is used for streaming, but is empty. The number and placement of tag bits for the pointer is variable, and multiple other conditions may be indicated by the tag bits (such as the use of logical data segment addressing). In general, sufficient tag bits are used to make the pointer self-describing. This facilitates the autonomous operation of the drive directed by the pointers.

Figure 8:
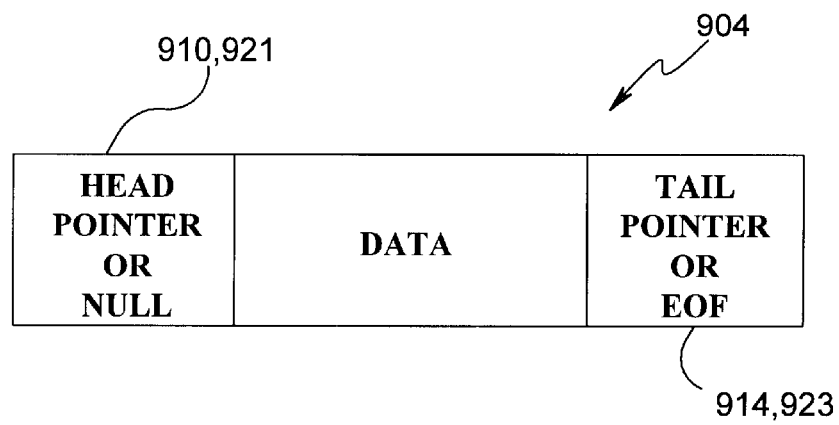
FIG. 8 is a graphical representation illustrating the use within a data structure of head-or tail-directed pointers having null or EOF values.

With reference to FIG. 8, there will now be described the use of null or end-of-file (EOF) values within the within the pointer fields (or data segments) of the data structures. A null pointer value is used when the data segment associated with the pointer(s) is the first data segment within a defined data stream or sequence (or portion thereof). Similarly, an EOF value is used when the associated data segment comprises the last data segment within the data stream. The controller responds to such data segments in accordance with their indications.

Figure 9:
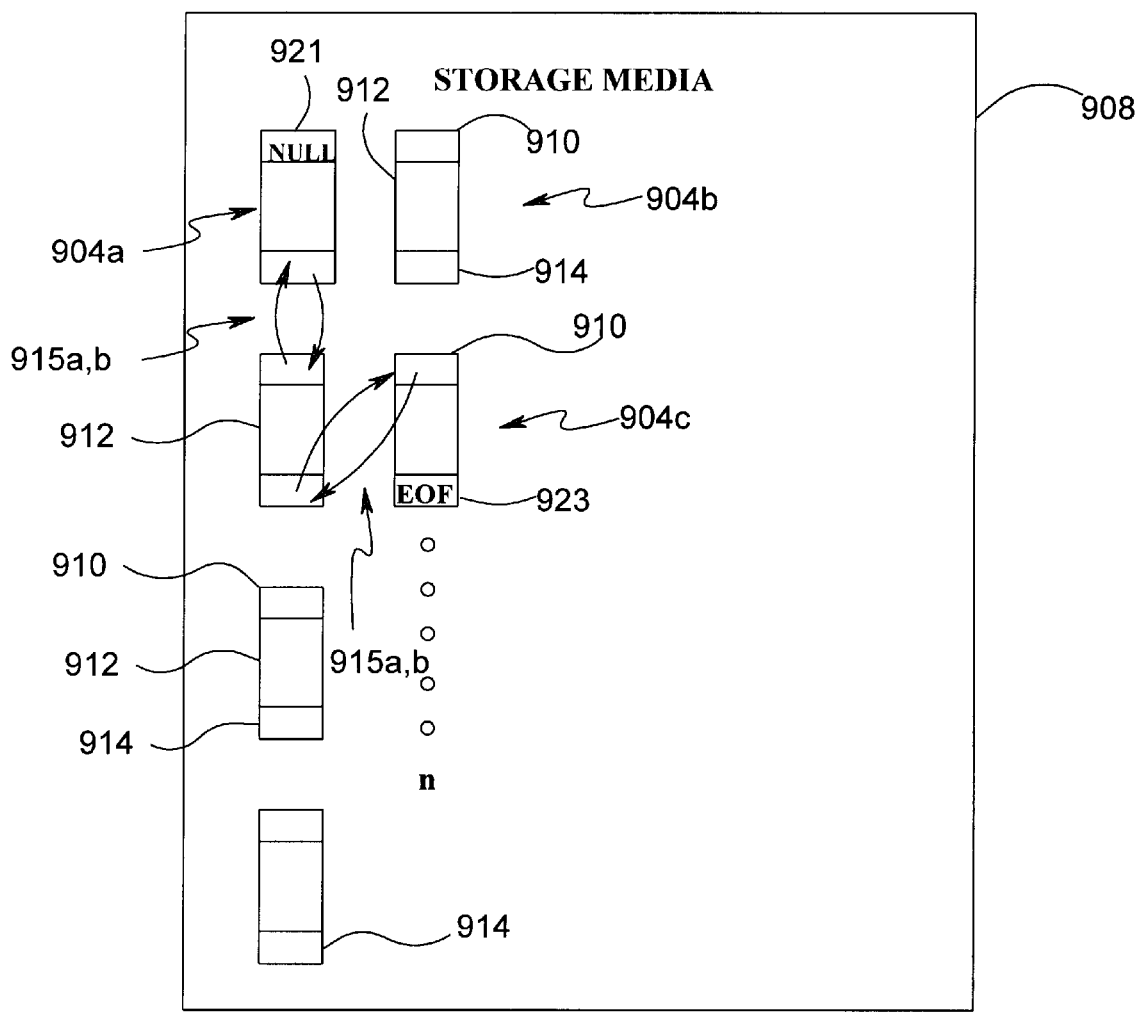
FIG. 9 is graphical representation of disk media illustrating the logical and physical relationship of data segments and their associated head-/tail-directed pointers.

With reference to FIG. 9, there will now be described an arrangement of data on a disk media 908 containing data structures 904. Each data structure 904 has three fields. The three fields are a first field for either a NULL pointer 921 or a head-directed pointer 910, a second field for a data segment 912, and a third field for either an EOF pointer 923 or a tail-directed pointer 914. The first field is disposed at the leading edge of data segment 912, and the third field disposed at the trailing edge of the data segment 912. A plurality of data segments (1 . . . n) are disposed on the surface of disk media 908 in a predetermined fashion to store the data segments needed to sequentially define a data stream or file. As represented by the arrow pairs 915a, 915b, head-directed pointer 910 of each data structure 904 "points" or refers to the H,C,S address of the preceding structure 904 in the digital data stream, while the tail-directed pointer refers to the H,C,S address of the next successive data structure in the stream. Hence, the tail-directed pointer 914 of a first data segment 904a is essentially a logical "mirror image" of the head-directed pointer of the next successive data segment 904b. This arrangement allows for the progression in either direction (i.e., forward from a first data structure 904a) to a last 904c, or backward from the last data structure 904c to the first 904a. Furthermore, since each data structure 904 is doubly linked (both head and tail-directed pointers being provided), the any data segment wherever logically positioned within the continuous data stream may be accessed and "played" in either direction, or truncated in discrete portions or segments. For example, if a user desires to begin playing a streaming video sequence at a particular location which may be specified in terms of minutes or other units into the data stream, the user may so specify with the user control depicted in FIG. 1. Disk drive 200 responds by calculating the displacement in units and follows the pointers to this displacement to begin reading data at the specified location.

As described with reference to FIG. 8, the NULL pointer 921 shown in the first data segment 904a of FIG. 9 indicates that it is the first data segment in the stream. No other data segments precede this first data segment in this particular stream. Similarly, the "end-of-file" (EOF) pointer 923 of the last illustrated data segment 904c precedes no other structures in the particular stream. Hence, by using the NULL and EOF pointers 921, 923, the boundaries of the data stream are readily defined.

The technique illustrated by FIG. 9 allows successive data segments in a digital data stream to be disposed at any physical location on the surface of the disk media 908. As described in greater detail below, however, there are advantages to be gained in appropriately allocating addressable locations for the successive data structures comprising each data stream. Principally, the preferred locations are determined to fall within particular constraints regarding latency from one data segment to the next. This is particularly advantageous if multiple streams are being read from or written to the disk media simultaneously.

FIG. 9 illustrates data structures 904 associated with the data stream from a logical standpoint on the surface of the disk media 908. The data structures may be arranged physically on the media surface in any fashion. Furthermore, the streamed digital data may optionally be written to only certain head, sector, cylinder addresses in order to "partition" the disk drive for other types or origins of data. In the personal computer example previously described, the synchronous streaming data may be physically partitioned from the asynchronous host data by restricting the streamed data to certain cylinders, such as cylinders 1 through n.

Figure 10:
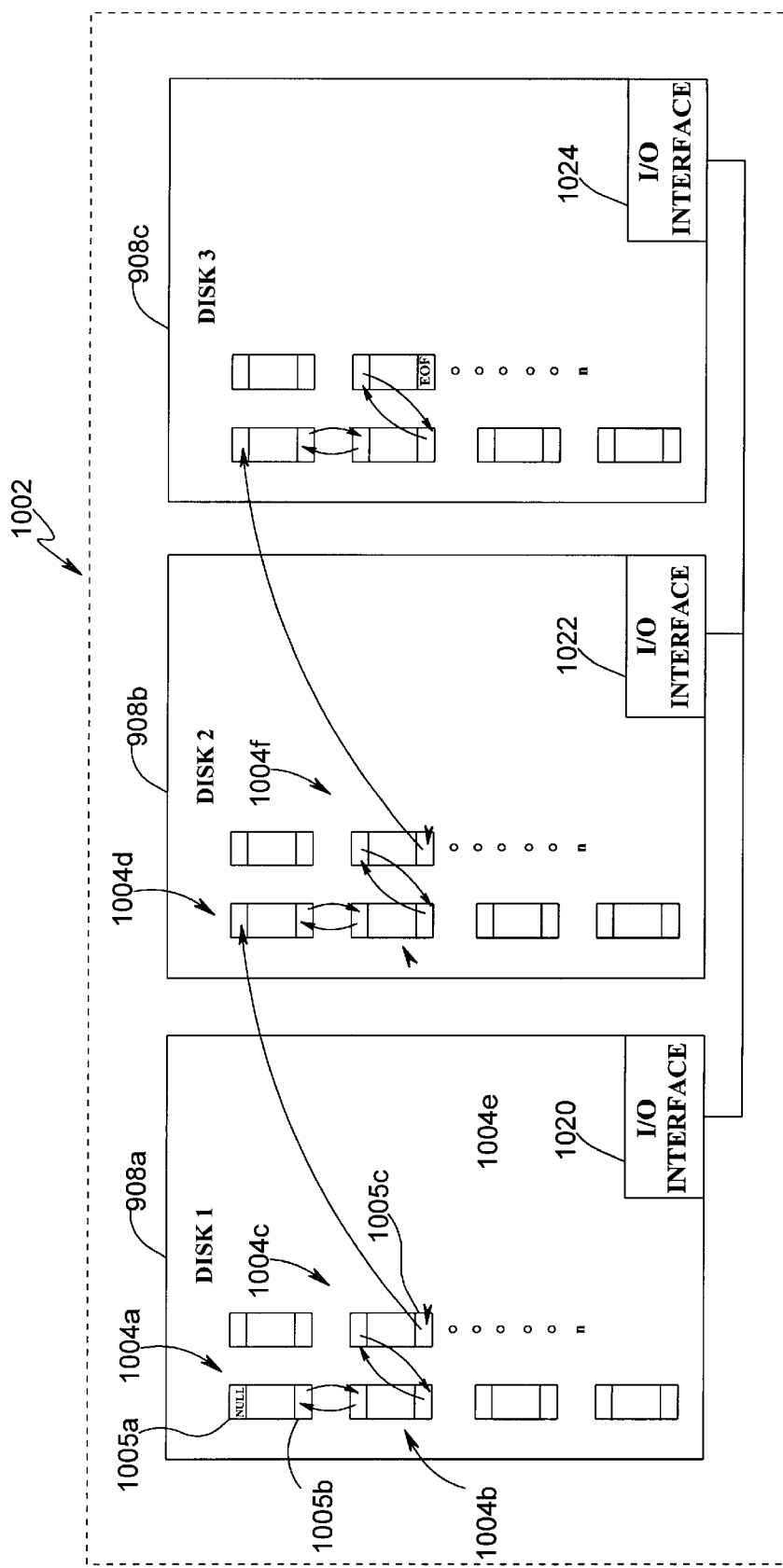
FIG. 10 is graphical representation of disk media defined by multiple storage disks, illustrating the logical and physical relationship of data segments and their associated head-/tail-directed pointers.

With reference to FIG. 10, a system having several disk drives has, in one embodiment, at least one of the tag bits associated with the pointers defined to indicate whether a pointer refers to a different disk drive. Upon encountering a pointer reference (whether forward or backward) containing the tag indicating another disk drive, the firmware for the originating drive responds to this information to signal the other, remote, disk drive to locate and transmit where directed the data segment which was the object of the pointer. Preferably, the disposition of the data segment pointed to is specified by the pointer. For example, additional tag bits may be utilized to indicate where the data should be conveyed. For example, the remote drive may convey the data segment directly to the buffer of the originating drive, or provided the data over its own or a common I/O interface to the requesting resource.

As shown in FIG. 10, multiple storage devices such as hard disk drives 908a–c are used to form a multiple storage device system 1002. In one embodiment, the separate drives 908a–c each has an I/O interface 1020, 1022, 1024 over which streaming (or other) data reproduced in accordance with the autonomously defined sequence directed by the pointers is provided. In an alternative embodiment, only one disk connects to the I/O interface, and acts as a master for the remaining disks in a disk array format. The first data structure 1004a of the first disk 908a is linked via the head/tail-directed pointers 1005a, 1005b to a second data structure 1004b, and that to a third data structure 1004c on the first storage device 908a. The last data structure 1004c of the first disk 908a is linked by the former's tail-directed pointer 1005e to a first data structure 1004d on the second disk 908b. In turn, this first data structure 1004d is linked to a second data structure 1004e on the second disk 908b, and so forth. In this fashion, a logical channel or data stream is formed using data structures 1004 which may be physically disparate from one another on different disk drives.

The individual disk media need not be of the same type or construction. For example, the first media could comprise a multi-disk rotating disk drive unit, the second a single disk rotating disk drive unit, and the third even another type of device. However, in one embodiment for independent disk drive units, the controllers are programmed to cooperate together in passing control from drive to drive, or to operate in a master slave configuration. Advantageously, the individual controllers operate using the autonomous pointer linked list operations. Alternatively, a single controller is configured to control all the drive units.

In this manner, parallel transfers affecting substantial numbers of devices can be initiated simultaneously, while maintaining autonomy from external computing resources. In large configurations, conforming drives, the participating drives are provided without reference to the topology of the connection. In this manner, a ring, tree or mesh organization may be accommodated. Even for complex operations, such as non-linear editing, which may required high level application software to control the process, these operations are simplified by the stream format described above on the set of drives.

Figure 11A:
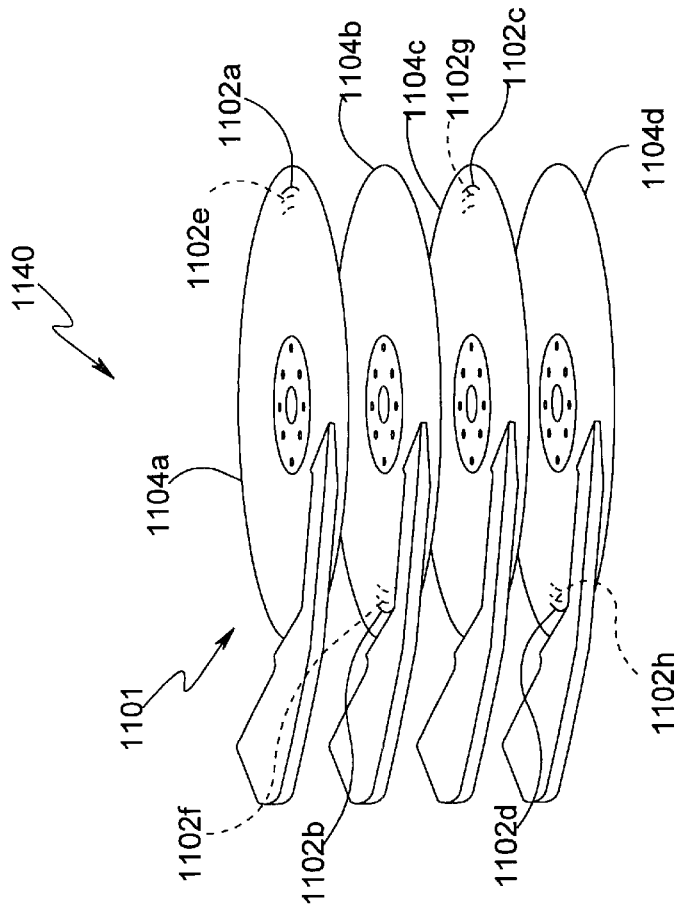
FIG. 11A is a perspective view of components of the HDA of FIG. 11 including a multiple disks and actuator arms.
Figure 11:
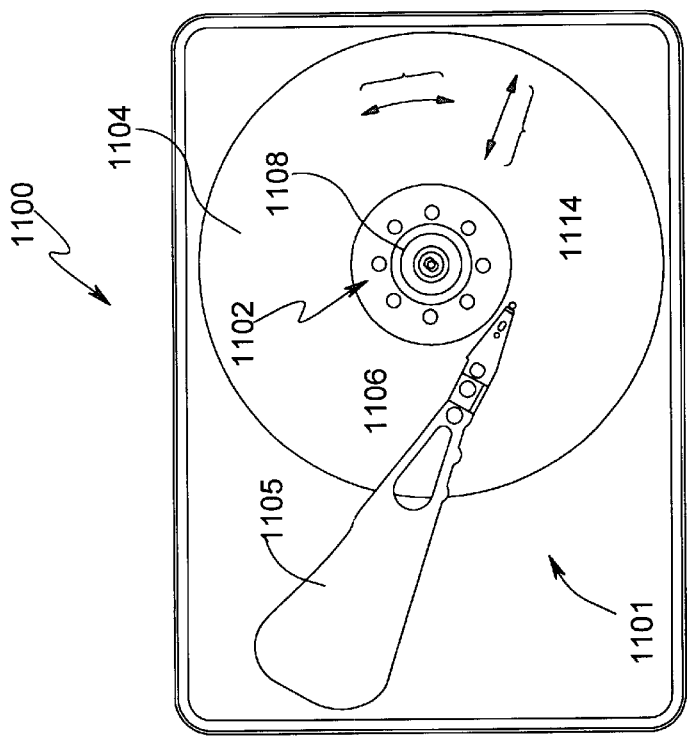
FIG. 11 is a schematic plan view of a head disk assembly (HDA)including actuator arm, read/write head, and rotating disk media.

With reference to FIG. 11, an HDA 1100 includes electromechanical structure 1101 having a central spindle-motor driven arrangement 1102, a rotating magnetic disk 1104, and a head stack assembly 1105 having a read/write head 1106. Disk 1104 rotates around an axis 1108, typically at a constant or near-constant angular rate. The head stack assembly is controllable to move read/write head 1106 in an arc which has a substantially radial direction relative to disk 1104.

With reference to FIG. 11A, an electromechanical structure 1140 for head sisk assembly 1100 suitably a plurality (e.g., four) disks 1104 mounted in a vertical or "stacked" configuration. In the structure 1140, the disks 1104 are arranged such that their axes of rotation are co-linear with a common spindle.

Data Segment Address Optimization

As illustrated in FIGS. 9 and 10, a linked list of pointers support autonomous reconstruction of a recorded data stream, or alternatively to partition an incoming data stream into data segments and to record the data segments. To select addresses for successive data segments written to or read from the storage device, internal latency is considered. Several types of internal latency exist in disk drives, including "seek" latency, rotational latency, and head switching latency. Cylinder seek latency involves time spent in repositioning a head in the direction indicated the arrow 1114 in FIG. 11; the amount of such repositioning time varies depending upon the length of the seek. Rotational latency involves time spent waiting for the leading end of an addressable location to revolve in the direction indicated by another arrow in FIG. 11 until the leading end moves under the head; the amount of such waiting time depending upon the arcuate distance the leading end of an addressable location has to travel to move under the head after the head has stabilized in position sufficient to access the addressable location. Head switch latency involves time required to accomplish head switching to select a different track on the same cylinder. Average rotational latency and average cylinder seek latency are typically the largest component of the total latency; hence, it is highly desirable to minimize rotational and cylinder seek latency in order to improve the temporal performance of the drive. Head switching latency, on the other hand, is typically minimal. The total latency of the device is not impacted significantly by the order of switching heads.

Another factor in the selection of data segment addresses within the media is the available buffer size. For example, when writing to the media using data received via the I/O interface, data which is received by the storage device but not yet written onto the disk is buffered in the buffer memory. If the time between individual write operations is comparatively long, the buffer size must be such that the entirety of the data received through the I/O interface is accommodated. As an example, if a full disk rotation is required between two successive write operations, the corresponding size of the data buffer will be approximately twice that needed if only one-half rotation of the disk is required between write operations. Hence, the use of "fractional" rotations of the disk reduces the size of the buffer required by the storage device. Reduced buffer memory size is generally desirable to lower the ultimate cost of the storage device as a whole. However, buffer size trade-offs for cost and performance exist.

Selection of data storage addresses and pointers on the disk media is made in a deterministic fashion using an allocation algorithm which accounts for latencies within the storage device. Supporting the timing demands for an output stream depends in part upon the stream's general rate, and in part upon buffer memory capacity. In general, the needs for replenishing the buffer memory provide a basis for setting a predetermined value ($\alpha$) specifying the maximum allowable latency that may occur between the end of one data segment being transferred to the buffer memory and the beginning of the next data segment. For any given point in three-dimensional storage space (H,S,C in the case of a multiple disk storage device), a set of points may be chosen such that the latency between the first point and each of the chosen points is less than or equal to the predetermined value ($\alpha$). This selection process forms a candidate set of H,S,C addresses within the three-dimensional space for the given point. By choosing storage addresses for each data segment in the stream using this "candidate set" approach, the temporal performance of the drive is improved, since the effect of any random component associated with the selection of data segment addresses is mitigated by controlling the total latency.

In addition to providing pointers and data segment storage addresses, it is preferable to provide dynamic allocation of buffer space within memory via a buffer manager module. So-called "high water" and "low water" marks are used by the buffer manager algorithm within the disk controller. For example, during a write operation, when the amount of data within the buffer (for example, 1 Mb of a 16 Mb memory) reaches a predetermined "high water" value, or when the latency value a is exceeded, additional memory may be allocated by the manager to handle the incoming data without delay. Similarly, when a "low water" mark is reached in the buffer during the write operation, the buffer size may be decreased. The converse is true during a read operation. It is noted that the data rate into or out of the buffer via the I/O interface is typically substantially lower than the rate at which data is read off of the media.

One effective method of minimizing the latency associated with a data streaming operation is to write to and read from each disk in an oscillatory fashion (i.e. incrementing/decrementing the cylinder address while cycling through the disk stack in sequence. In this embodiment, reads/writes of successive linked data structures within a digital data stream occur on successive fractional rotations of the disk media. In one preferred embodiment, the fractional rotations comprise sector rotations for each subsequent read/write operation. Other rotation increments may be used. In this embodiment, a first data structure is read from or written to the disk media at a given sector and cylinder address, followed by a second read/write operation at a sector address 180-degrees (or near thereto) from the first. The cylinder address during such operations may or may not change, based on the pointer for the next data segment.

The concept is illustrated using the exemplary embodiment of FIG. 11A. A write operation of a single digital data stream is depicted. A read operation is analogous. As shown in FIG. 11A, the first disk media 1104a has a first data structure 1102a written at a first head, sector and cylinder address. As the disk media 1104a–d rotates, a second data structure 1102b is written onto a second sector of the next successive disk 1104b (requiring a head switch) which is physically located about 180 degrees from the first data structure, yet which has the same cylinder address. Subsequently, a third data structure 1102c is written onto the third disk media 1104c (requiring another head switch) at a location 180 degrees in rotational displacement from the second data structure 1102b, and 0 degrees from the first data structure 1102a. The cylinder address for this third data structure 1102c is the same as that of the first two data structures 1102a, 1102b. Next, a fourth data structure 1102d is written onto the fourth disk media 1104d (requiring another head switch) at a point 180 degrees from the third data structure 1102c. At this point, the head address is switched such that the read/write head associated with the first disk media 1104a is again selected. However, the cylinder address is now varied, and the foregoing process of writing data sectors 180 degrees apart initiated again. As the 180-degree shifted sectors 1102e–h associated with the new cylinder address are written, the head address is again returned to that of the first disk media 1004a, and the process repeated.

The data read/write sequence of the foregoing exemplary embodiment of FIG. 11A may readily be modified. For example, upon the completion of writing one data structure to each of the disk media 1104a–d, the cylinder address may be changed without changing the read/write head, such that the next data structure is written onto a second sector of the last disk 1104d, the second sector being 180 degrees in arc from the prior sector written on that disk. The remaining disks may then be written to in reverse order (i.e., 1104c, then 1104b, then 1104a).

Alternatively, the disks 1104a–d may be read from/written to such that data structures exist on each disk 180 degrees opposed from one another. For example, the first data structure could be written to a first sector of the first disk 1104a, with the second data structure written to a second sector physically located 180 degrees from the first, yet on the same disk 1104a. A second "pair" could then be written successively on the second disk 1104b, and so forth.

In yet another alternative, the data structures may be written to the disk by varying both the head and cylinder address on each subsequent write operation, the latter being made 180 degrees apart from its predecessor. Slight rotational displacement from 180° is required at some point, and can be integrated into each new data segment address if desired.

Figure 12:
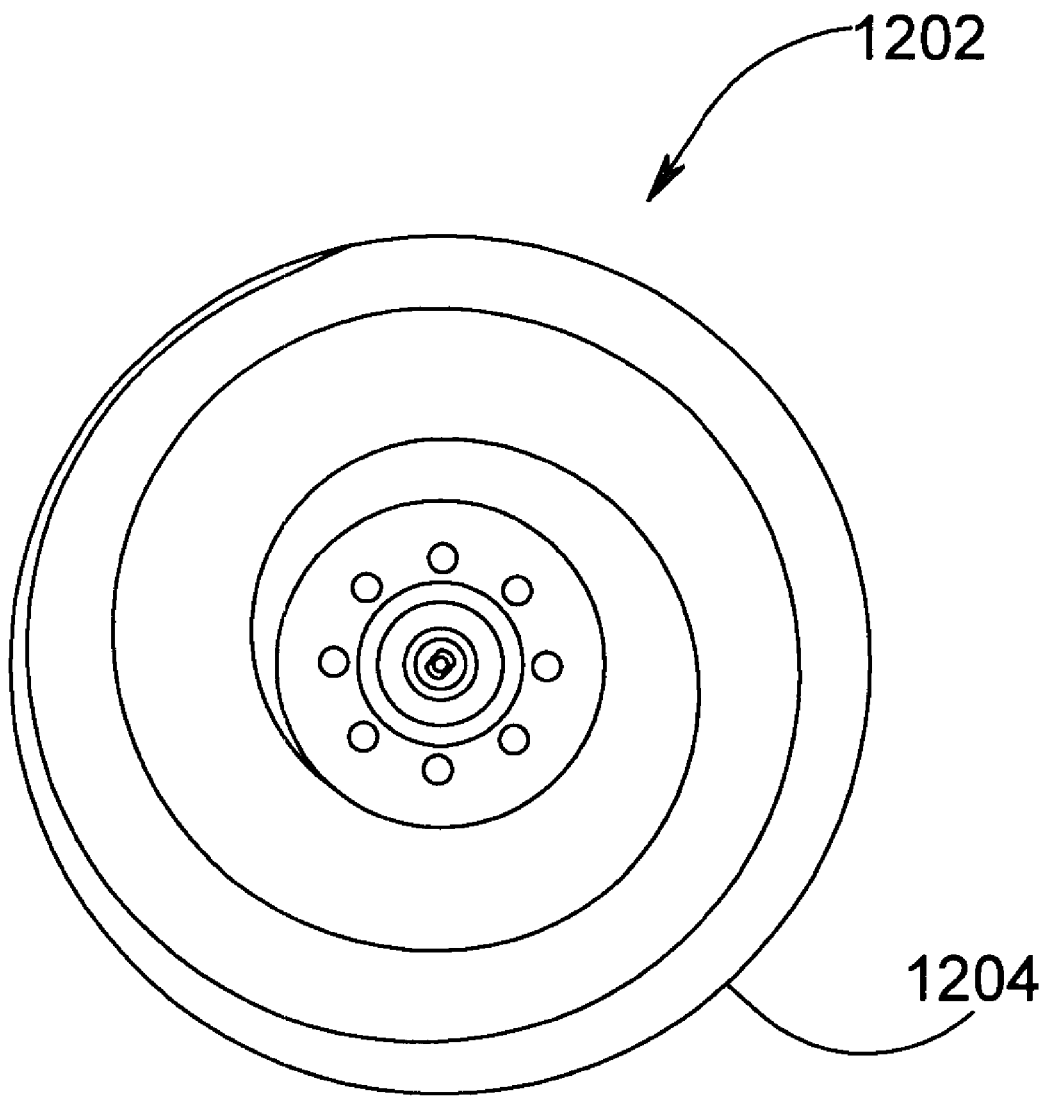
FIG. 12 is a schematic plan view of a rotating disk having a spiral format.

With reference to FIG. 12, a disk storage device 1202 has a storage pattern on one or more rotating disks 1204 as previously described. Each media disk is written (either dynamically during streaming, or preformatted prior to operation) such that successive data segment addresses form a physical spiral (two-dimensional) or helix (three-dimensional across multiple media) within the media. In this fashion, the physical disposition of the addresses defines the logical structure of the linked list. In the case of a single data stream, successive data segments are recorded along the spirals or helices. For multiple streams, multiple spirals or helices are defined.

Multiple Stream Optimization

The foregoing discussion has focused primarily on the instance where one digital data stream is being read from and/or written to the storage device media at any given time. However, the autonomous linked list functionality may also advantageously be implemented when processing two or more distinct data streams, such as multiple video data streams being input to a single data storage and editing device. Such multi-stream processing is particularly useful with respect to non-linear editing of video data. Processing multiple streams is possible when the read/write speeds for this disk media exceed the required transfer rate from the disk drive over the I/O interface.

A more complex approach is utilized for optimizing the storage locations and pointer associated with multiple simultaneous data streams received by the storage device. Ideally, the maximum allowable latency $\alpha$ is imposed on the data of all streams. In the case where the multiple streams are each closely correlated to one another, a minimum temporal or physical offset is possible and the maximum latency value can be respected. However, in the case of random or poorly correlated streams, the maximum latency value may be violated with the existing defined available buffer capacity.

In a first embodiment, the media disks of the storage device are pre-formatted for a pre-selected number of different data streams. In this fashion, the latency may be algorithmically determined in advance, and restricted to values less than $\alpha$ for all streams simultaneously consistent with the buffer capacity.

In a second embodiment, latency is buffered within certain intermediate media sectors that are unallocated so as to reduce the buffer allocation required. Specifically, an algorithm within the disk controller performs anticipatory calculations for the data streams (such as by "reading ahead") to identify those areas where additional buffering is required beyond the available capacity. For these instances, data is written to or read from the selected intermediate media location in order to reduce the latency at the desired point. In this embodiment, empirical or estimation-based techniques of the type well known in the data processing arts are used to perform the anticipatory calculation of multi-stream latency, although it will be appreciated that other techniques may be used.

Figure 13:
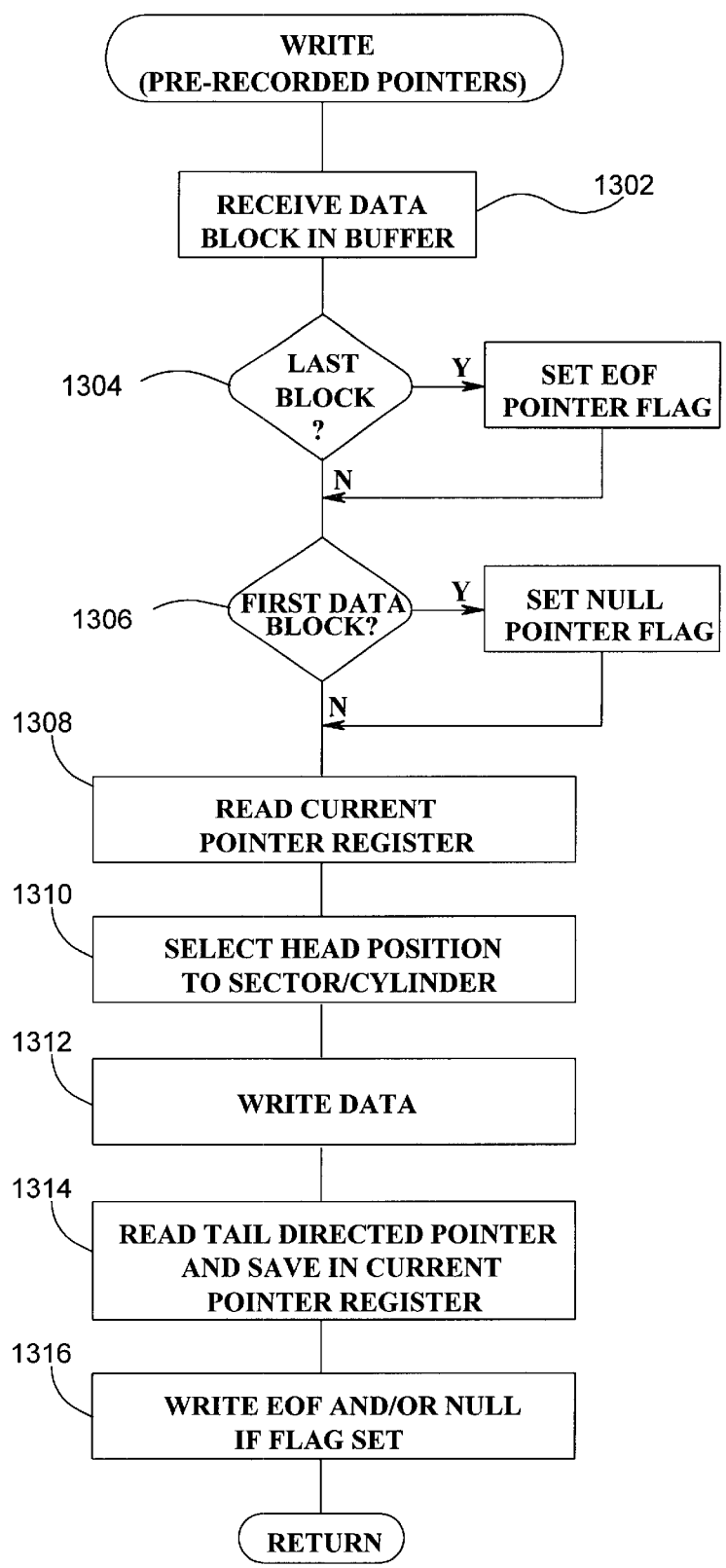
FIG. 13 is a logical flow chart illustrating an example of a data "write" operation using media having the linked list pointers pre-recorded thereon.

FIG. 13 illustrates a first embodiment of an exemplary write operation using pointers which are pre-recorded (pre-formatted) within the media of a disk drive. In a first step 1302, data via the I/O interface is received into the data buffer of the storage device. Next, the positional status of the received data segment is determined in steps 1304 and 1306. If the data segment is the last data segment in the stream, the EOF pointer flag is set, and if the data segment is the first data segment in the stream, the NULL pointer is set. The current pointer register is next read in step 1308, and this information passed to the disk controller 208 (FIG. 2). The position control 104 of the disk controller 208 drives the activator 106 to select the appropriate read/write head and reposition it to the sector/cylinder address read from the current pointer register in step 1310. In the next step 1312, the received data segment is written to the disk media. The pre-stored tail-directed pointer associated with the address where the data segment was written in step 1312 is read in step 1314, and this tail-directed pointer is stored in the current pointer register. In step 1316, the EOF and NULL flags associated with the received data segment (see steps 1304 and 11306 above) are read. If either flag is set, EOF or NULL tag bit are written in the preformatted pointer on the disk media. In other words, although the pointer for the data segment was pre-recorded, a swap of the tag bit indicating null or EOF is made. The storage device controller then proceeds to the next contiguous data segment, and the process is repeated.

Figure 14:
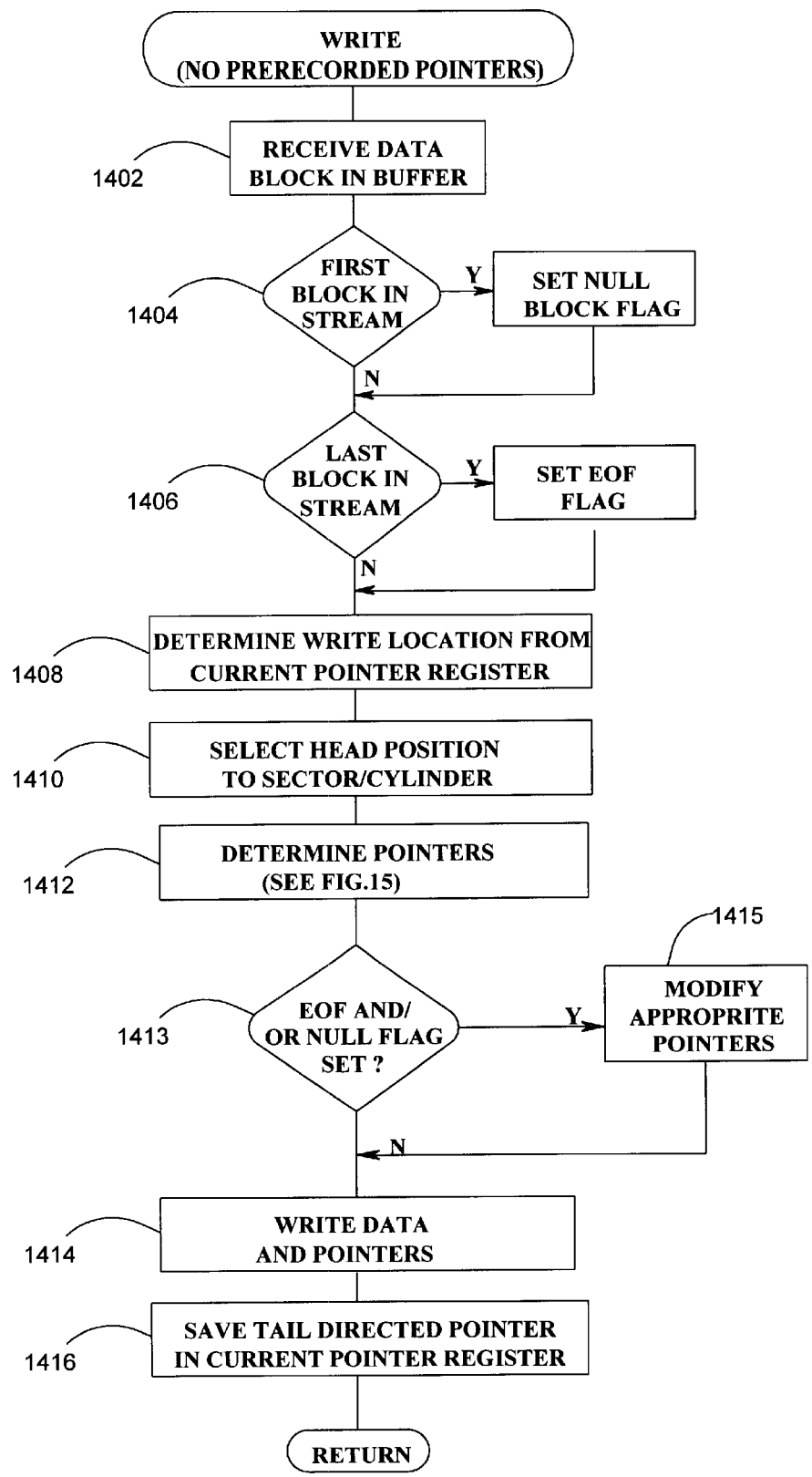
FIG. 14 is a logical flow chart illustrating an example of a data "write" operation where the disk controller dynamically generates pointers during operation.

FIG. 14 illustrates a second embodiment of an exemplary write operation using pointers which are not pre-formatted within the media, but rather are dynamically calculated. In a first step 1402, data via the I/O interface is received into the buffer of the storage device. Next, the positional status of the received data segment is determined in steps 1404 and 1406. If the data segment is the last data segment in the stream, the EOF pointer flag is set, and if the data segment is the first data segment in the stream, the NULL pointer flag is set. The current pointer register is next read in step 1408, and this information passed to the disk controller 208 to select the appropriate read/write head and reposition it to the sector/cylinder address indicated from the current pointer register in step 1410. In the next step 1412, the pointers are determined or generated as discussed in greater detail with reference to FIG. 15 below. After the pointers have been generated, the EOF and NULL flags are checked in a step 1413. If either or both flags are set (see steps 1404 and 1406 above), either or both pointers are modified as appropriate in a step 1415. For example, this occurs if the appropriate tag bit is set in the appropriate pointer or NULL data or EOF data is written for the pointer address. Next, the received data segment and generated pointers are written to the disk media in step 1414 at the location retrieved from the current pointer register. Next, in step 1416, the tail-directed pointer generated in step 1412 is stored in the current pointer register. The storage device controller then proceeds to the next received data segment, and the process is repeated.

Figure 15:
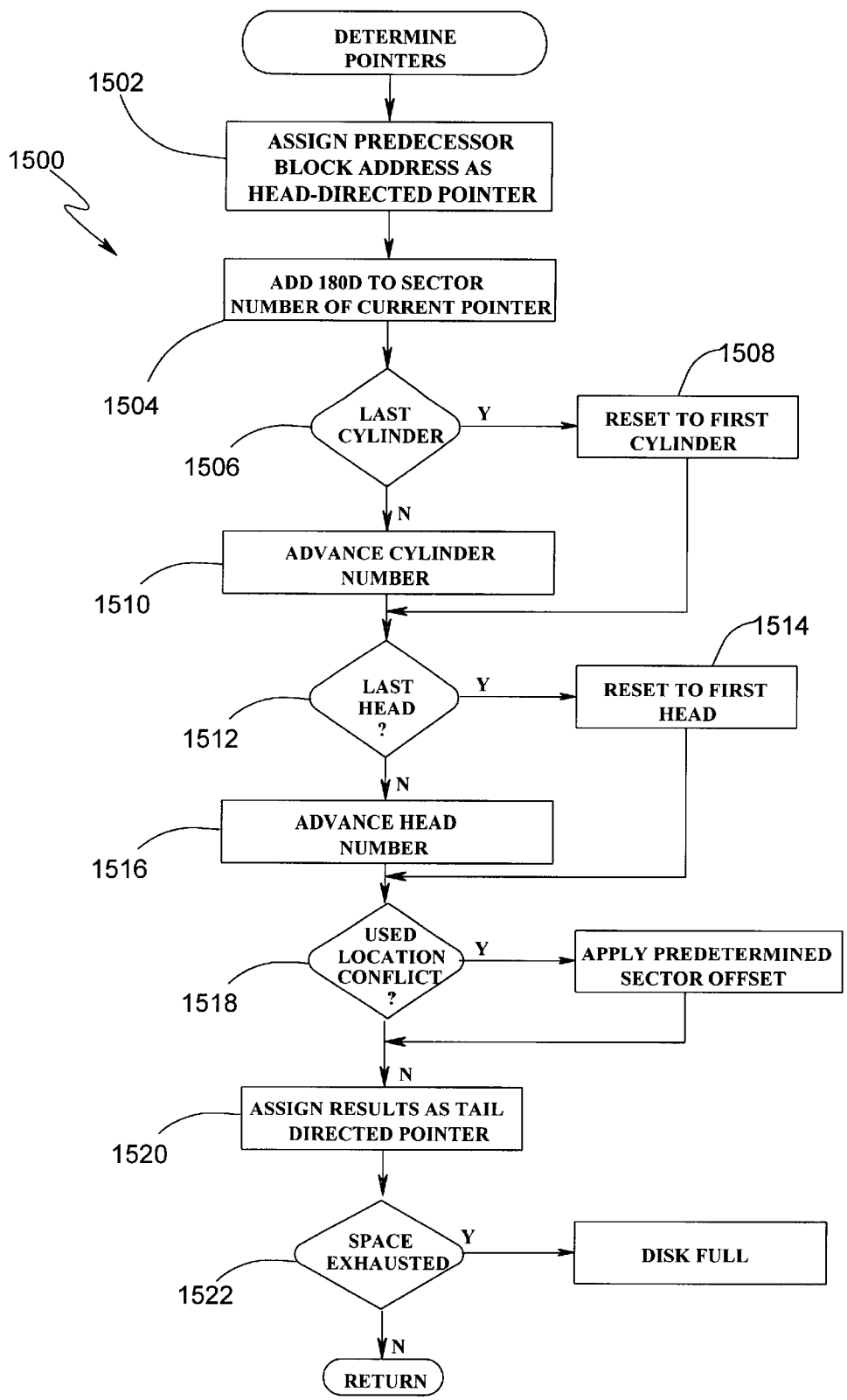
FIG. 15 is a logical flow chart illustrating one embodiment of the methodology used to generate the pointers as part of the data write operation of FIG. 14.

With reference to FIG. 15, a method 1500 of determining pointers (step 1412 of FIG. 14) begins by assigning the address of the predecessor data segment as a head-directed pointer in step 1502. Next, the sector address of the current pointer register is read and 180 degrees is added (in one embodiment) in step 1504. In step 1506, the cylinder address of the write location is analyzed (such as through comparison to a predetermined value) to determine if the last cylinder on the media is selected. If so, the cylinder address is reset to the first cylinder in step 1508. If not, the cylinder address is incremented by one in step 1510. Next, in step 1512, the head address of the write location is analyzed to determine if the last head in the disk stack is selected. If so, the head address is reset to the first head in the stack in step 1514. If not, the head address is incremented by one in step 1516. Next, in step 1518, the existence of an address conflict is determined. Specifically, the address generated via steps 1504 through 1516 is analyzed to determine if that address has already been allocated to another data segment. If so, then a predetermined sector offset is applied to the existing sector address of step 1504. Alternatively, an algorithm may be used to optimize the selection of a substitute address based on minimizing latency within the drive, as previously discussed. The offset or "corrected" address is then assigned to the current data segment as a tail-directed pointer in step 1520. Lastly, in step 1522, the status of available data storage space is assessed; if the disk is full, then a flag is set (or alternatively another storage device selected). If the disk is not full, then the head or tail-directed pointers are returned to the write operation of FIG. 13 and current data segment with pointers is written to the disk per step 1414 of FIG. 14.

Figure 16:
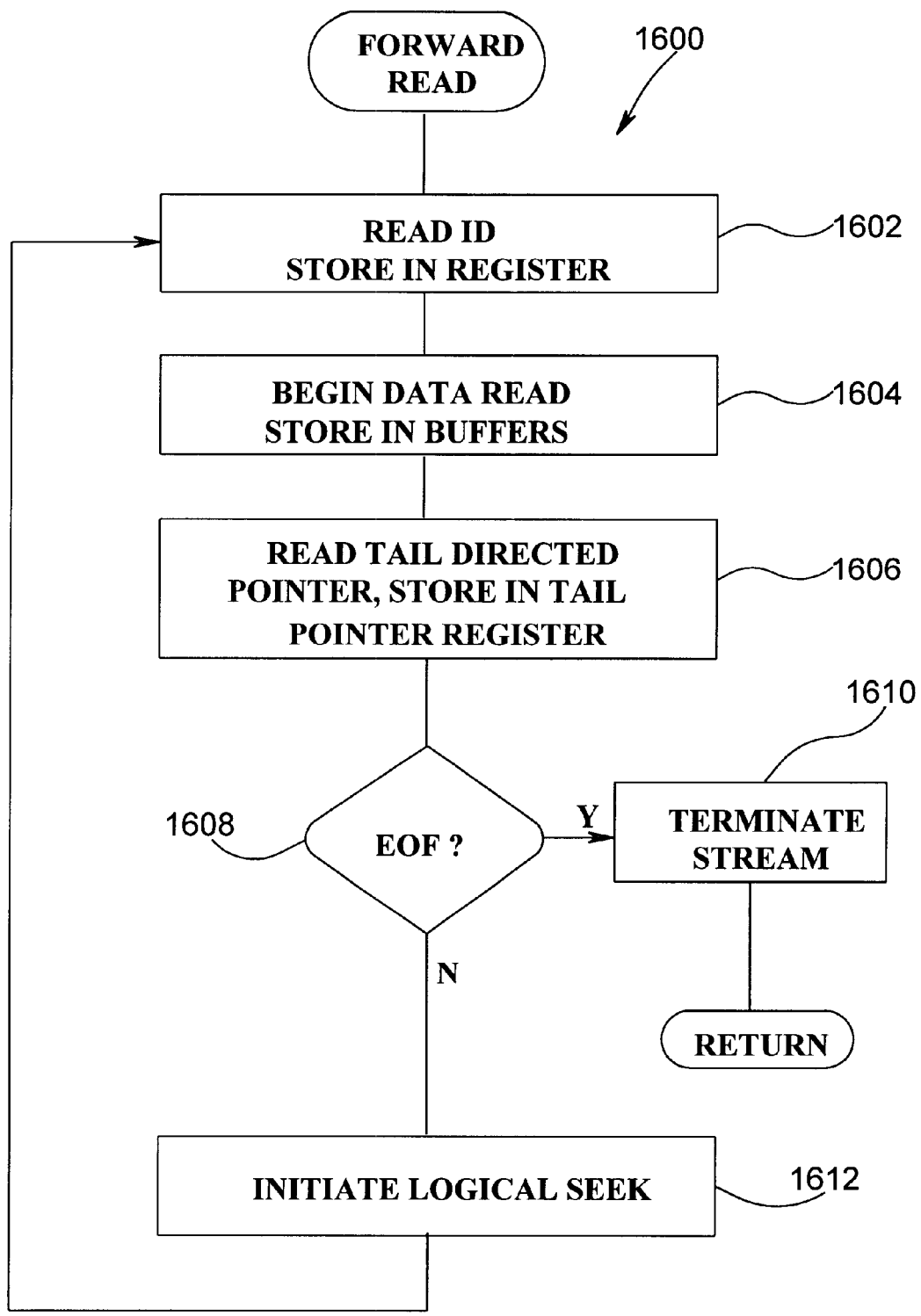
FIG. 16 is a logical flow chart illustrating an example of a data "read" operation in the forward direction using the linked list.

With reference to FIG. 16, a method 1600 for the "forward read" operation has a first step 1602 in which the identification (ID) field value stored in the controller register is read. Next, the data segment associated with the ID is stored within the data buffer of the storage device in step 1604. Next, in step 1606, the tail-directed pointer associated with the read data segment is read and stored within the tail pointer register. The EOF bit or pointer status is checked in step 1608; if the flag pointer is an EOF pointer, the data stream is terminated per step 1610. If the data segment is not the EOF, then a logical seek operation is initiated in step 1612 based on the tail directed pointer address. The result is that the head is positioned with the actuator 106 (FIG. 1) in response to the tail-directed pointer via the position control 104 (FIG. 1). After the seek operation of step 1612 is completed (the head is now positioned to read the next data segment), the ID of the next data segment in the stream is read per step 1602. This process is repeated until the EOF flag is detected, and the stream terminated per step 1610.

Figure 17:
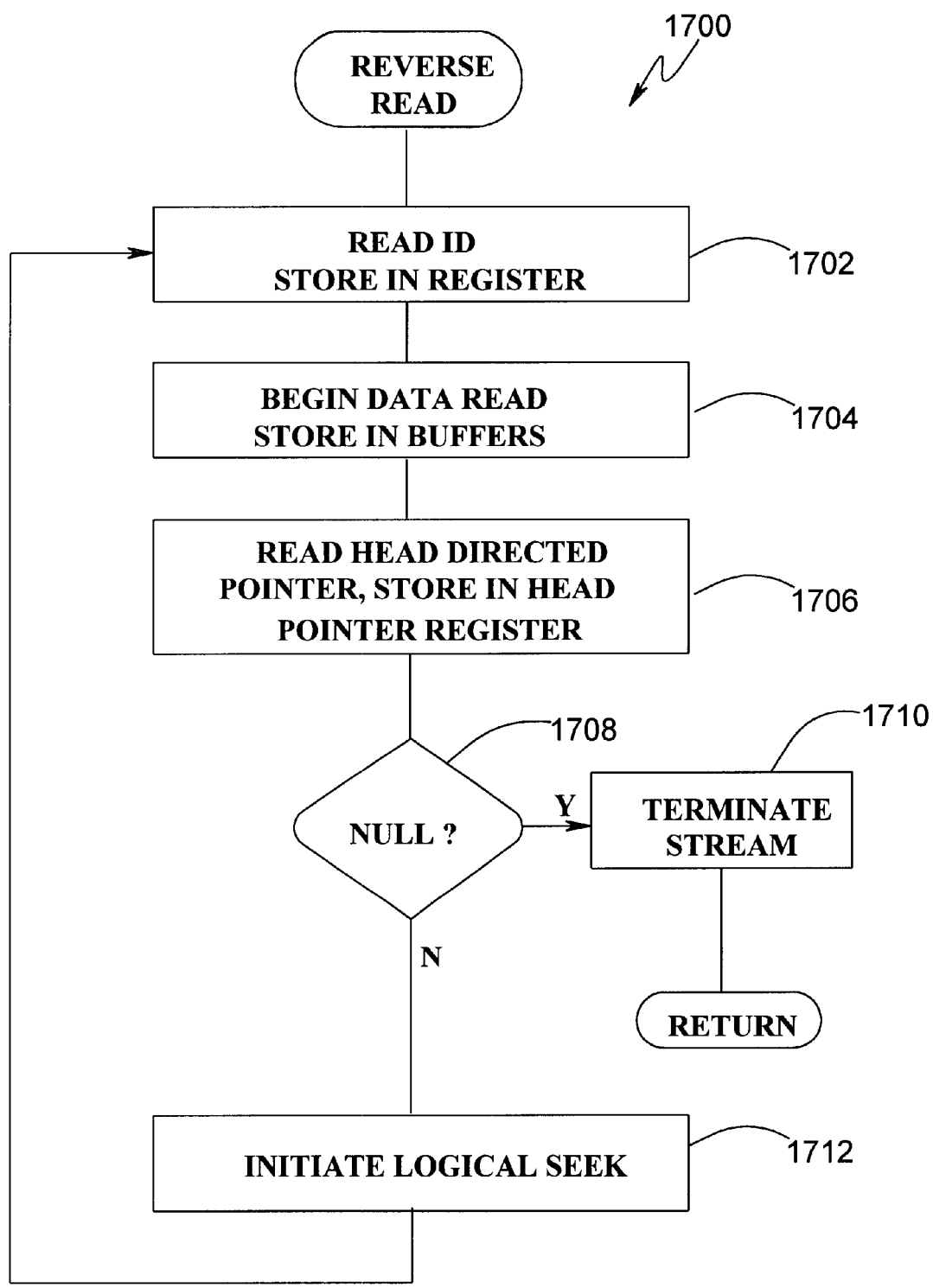
FIG. 17 is a logical flow chart illustrating an example of a data "read" operation in the reverse direction using the linked list.

With reference to FIG. 17, a method 1700 for the "reverse read" operation is has a first step 1702 in which the identification (ID) field value stored in the controller register is read. Next, the data segment associated with the ID is stored within the data buffer of the storage device in step 1704. Next, in step 1706, the head-directed pointer associated with the read data segment is read and stored within the head pointer register. Subsequently, the NULL condition is checked in step 1708 from the tail-directed pointer. If the flag is set, the data stream is terminated per step 1710. If the NULL condition is not found, then the logical seek operation is initiated in step 1712 based on the head-directed pointer. The result is that the head is positioned with the actuator in response to the head directed pointer via the position control 104 at the location of the preceding data segment. After the seek operation of step 1712 is completed, the ID of the next (preceding) data segment in the stream is read per step 1702. This process is repeated until the NULL pointer is detected, and the stream terminated per step 1710.

With respect to the write and read operations illustrated in FIGS. 13 through 17, the pointer operations allow for the effectively simultaneous reading and writing of a given data stream by the storage device. For example, the constituent data segments of an incoming data stream may be identified, buffered, allocated to addressable storage locations on the media, and associated with pointers as previously described. Simultaneously, data segments of a data stream which have been written onto the media may be read from their storage locations and transmitted via the same or another I/O interface within the storage device under control of the stored pointers and position control 104 and actuator 106.

Figure 18:
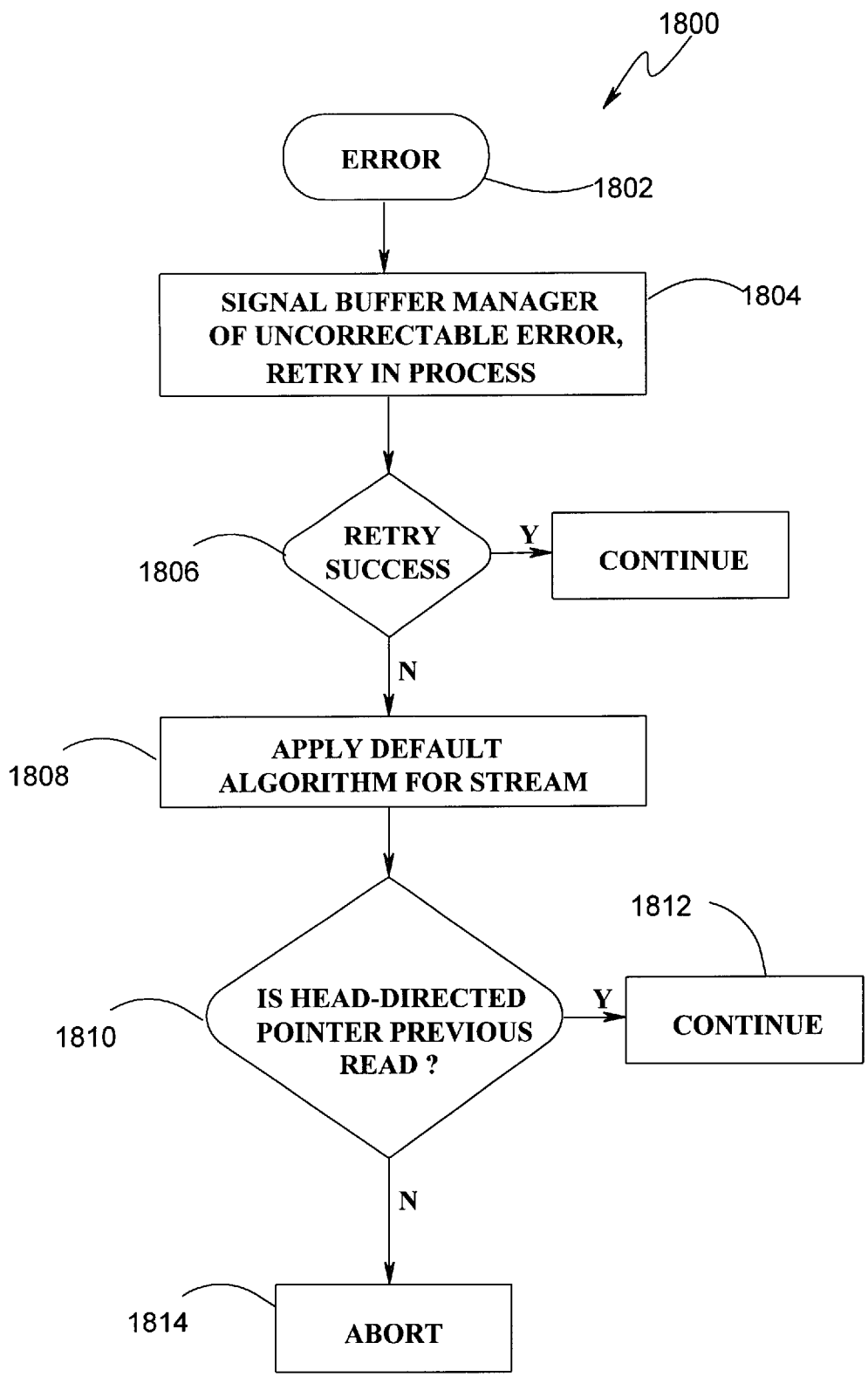
FIG. 18 is a logical flow diagram illustrating an example of an error correction method for correcting errors during disk operations.

FIG. 18 illustrates one embodiment of the pointer error correction method 1800. As is well known in the data storage arts, error correction may be employed to detect and correct errors within fields or data segments of data during read/write operations. The linked list provides error correction that accounts for the presence of the head- and tail-directed pointers previously described. In the embodiment of FIG. 18, the pointer error correction is initiated in step 1802 when an error is present in the pointer being read. Upon error detection, the buffer manager is signaled as to the existence of the error, and a retry of the read is initiated in step 1804. The success of the retry of the read in step 1804 is subsequently evaluated in step 1806. If the read retry is successful, the streaming algorithm continues as if no error was initially detected. If the read retry was unsuccessful, the data segment address and pointer generation algorithm previously described is applied in step 1808 to the pointer to generate the succeeding data segment address and head-directed pointer. This head-directed pointer is then tested in step 1810 to evaluate its ability to link the new data segment address with the prior data segment. This is done by testing the head directed pointer for correlation to the previous read address. If the test is passed, then the data streaming operation is continued per step 1812. If the test is not passed, then the streaming operation is aborted per step 1814.

Simply stated, the foregoing error correction method 1800 of FIG. 18 utilizes the address and pointer generation algorithm to calculate a new pointer for the current data segment. If the head-directed pointer does not correspond to the previous read address, then the streaming operation is aborted. It is noted that this method 1800 is compatible both with the pre-formatted and the non pre-formatted pointer embodiments previously described. In the case of the pre-formatted pointer embodiment, the algorithm by which the media was originally formatted is made resident within the controller 208, such that it may be used during the error correction routine of FIG. 18 to calculate the next logical address in the sequence.

Figure 19:
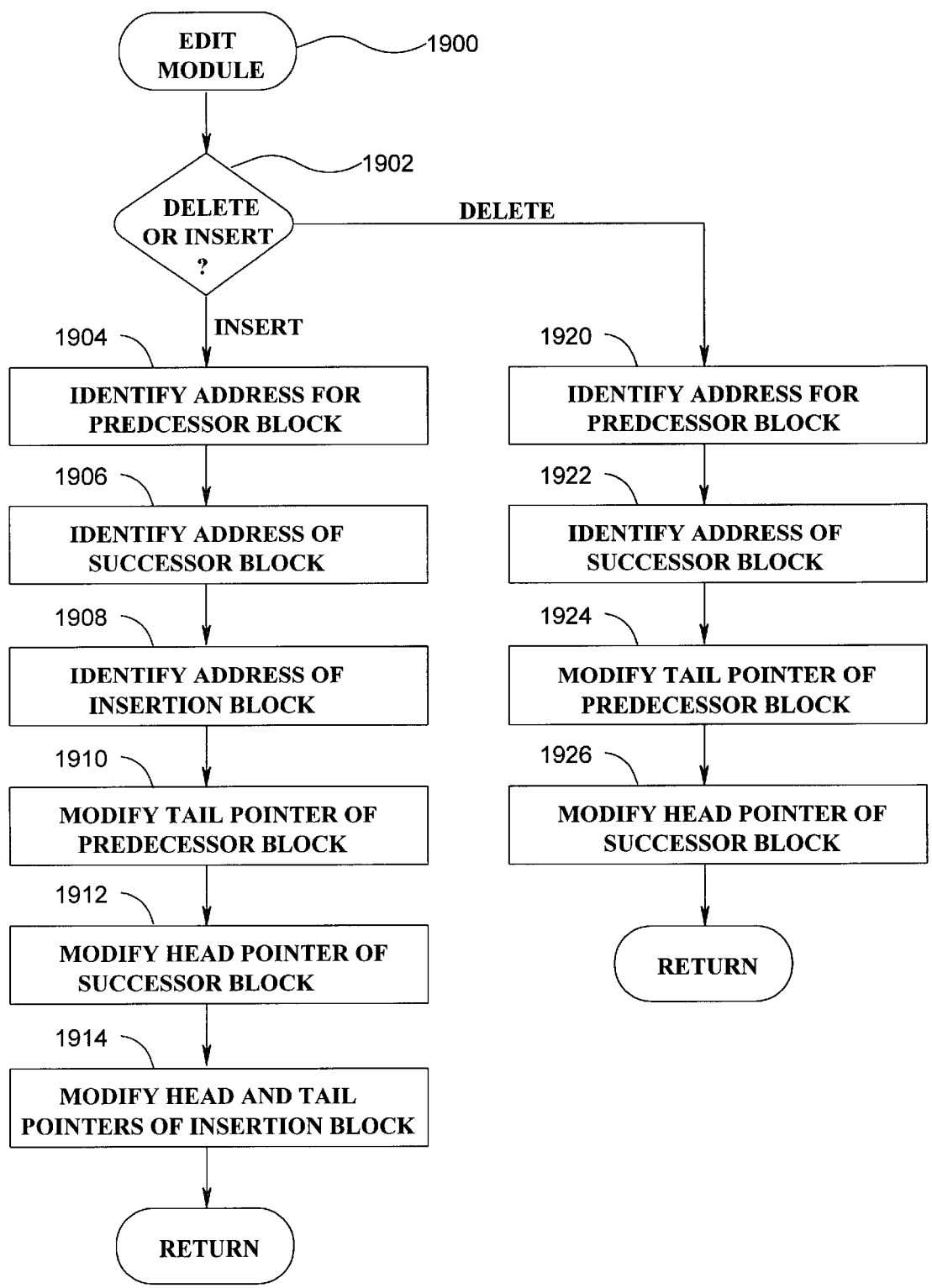
FIG. 19 is a logical flow diagram illustrating an example of an autonomous edit function.

FIG. 19 illustrates one exemplary embodiment of an edit function data stream. The edit function allows for the insertion or deletion of data segments within one or more data streams by the user. Upon entering the edit module 1900, the selection between insertion and deletion of data in the selected stream(s) is made in step 1902. If insertion is selected, the address of the data segment immediately preceding the data segment to be inserted (i.e., the "predecessor" data segment) is identified in step 1904. Similarly, the address of the data segment immediately following the data segment to be inserted (i.e., the "successor" data segment) is identified in step 1906. Next, the address of the data segment to be inserted is identified in step 1908. In step 1910, the tail-directed pointer of the predecessor data segment is modified to indicate the address of the data segment to be inserted. Similarly, in step 1912, the head-directed pointer of the successor data segment is modified to indicate the address of the data segment to be inserted. Lastly, in step 1914, the head- and tail-directed pointers of the data segment to be inserted are modified to indicate the address of the predecessor data segment and successor data segment, respectively. In this fashion, a seamless "chain" of data segments (including the newly inserted data segment) each having a head- and tail-directed pointers is formed.

In the event that more than one data segment is to be inserted, the insertion steps 1904–1914 are repeated for each successive data segment until all have been inserted. In an alternative embodiment, the addresses for (i) the data segment immediately preceding the first data segment to be inserted; (ii) the data segment immediately following the last data segment to be inserted (steps 1904 and 1906); and (iii) each of the data segments to be inserted (step 1908), may be identified, and the head-directed and tail directed pointer of both the predecessor and successor data segments modified to indicate the address of the first data segment and last data segment to be inserted, respectively. Then, the head-directed and tail-directed pointers of each data segment to be inserted are modified based on the addresses of the predecessor and successor data segments, as well as the addresses of the intermediary data segments (i.e., those between the first and last data segments to be inserted). Using this alternative embodiment, multiple data segments are first formed into a smaller continuous segment, the entire segment then being inserted into the data stream.

If the selection for deletion of data segment within the stream is made, the addresses of the predecessor and successor data segment are identified in steps 1920 and 1922, respectively. Subsequently, the tail-directed pointer of the predecessor data segment is modified to indicate the address of the successor data segment in step 1924. Lastly, in step 1926, the head-directed pointer of the successor data segment is modified to indicate the address of the predecessor data segment, thereby completing the linkage between the predecessor and successor data segments. As with the insertion function previously described, deletions of multiple data segments may be performed sequentially (i.e., data segment-by-data segment using the method of steps 1920 through 1926), or several data segments at a time.

Many variations of the methods described above with reference to FIGS. 13–19 may be utilized. Specifically, certain steps may be optional, or alternatively may be integrated with other steps under certain conditions. Similarly, other steps not specifically described herein may be added to the foregoing embodiments. Additionally, the order of performance of certain steps may be permuted, or such steps may be performed in parallel (or series) if desired.

I claim:

1. A disk-based storage system for storing a plurality of data segments and for responding to a direction-selection signal by autonomously providing the data segments in a selected sequence so as to be concatenated together to define a continuous data stream, the disk-based storage system comprising:

nonvolatile storage means including rotating disk media having a plurality of addressable locations, each of the data segments being stored in a respective one of the addressable locations, each of the addressable locations having a leading end and a trailing end, a first one of the addressable locations having a trailing end on a first track, a second one of the addressable locations having a leading end on a second track, the second track being spaced from the first track;

the non-volatile storage means including means locally storing a doubly-linked list of pointers;

accessing means controllable to seek to, and access, any of the addressable locations starting at the leading end and continuing through the trailing end;

controller means for causing the accessing means to read the data segments in accordance with a sequence determined by the doubly-linked list of pointers and the direction-selection signal, the controller means including autonomously-operating control means responsive to the trailing end of the first one of the locations having been read for causing the accessing means to seek to the second track.

2. A disk-based storage system according to claim 1, wherein the means locally storing the doubly-linked list includes the rotating disk media.

3. A disk-based storage system according to claim 1, wherein the means locally storing the doubly-linked list includes the rotating disk media; and the accessing means includes electromechanical accessing structure and electronic accessing structure.

4. A disk-based storage system according to claim 1, wherein the system includes a buffer memory for storing a plurality of data segments read from the rotating disk media.

5. A disk-based storage system according to claim 1, wherein one of the addressable locations stores a null pointer, a payload comprising a data segment, and a tail-directed pointer.

6. A disk-based storage system according to claim 1, wherein one of the addressable locations stores an end-of-file (EOF) pointer, a payload comprising a data segment, and a head-directed pointer.

* * * * *